(12) United States Patent
Zhang et al.

(10) Patent No.: US 11,455,297 B2
(45) Date of Patent: Sep. 27, 2022

(54) MANAGING TRANSACTION REQUESTS IN LEDGER SYSTEMS

(71) Applicant: ALIPAY (HANGZHOU) INFORMATION TECHNOLOGY CO., LTD., Zhejiang (CN)

(72) Inventors: Yuan Zhang, Hangzhou (CN); Benquan Yu, Hangzhou (CN); Yize Li, Hangzhou (CN); Wenyuan Yan, Hangzhou (CN); Xinying Yang, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/218,003

(22) Filed: Mar. 30, 2021

(65) Prior Publication Data
US 2021/0334268 A1    Oct. 28, 2021

Related U.S. Application Data

(63) Continuation of application No. PCT/CN2020/086204, filed on Apr. 22, 2020.

(51) Int. Cl.
*G06F 16/23* (2019.01)
*G06F 16/22* (2019.01)
(Continued)

(52) U.S. Cl.
CPC ...... *G06F 16/2379* (2019.01); *G06F 16/2272* (2019.01); *H04L 9/3247* (2013.01); *H04L 63/08* (2013.01)

(58) Field of Classification Search
CPC ............. G06F 16/2379; G06F 16/2272; H04L 9/3247; H04L 63/08
See application file for complete search history.

(56) References Cited

U.S. PATENT DOCUMENTS

| 6,182,139 B1 | 1/2001 | Brendel |
| 6,587,945 B1 | 7/2003 | Pasieka |

(Continued)

FOREIGN PATENT DOCUMENTS

| CN | 106375317 | 2/2017 |
| CN | 107480990 | 12/2017 |

(Continued)

OTHER PUBLICATIONS

U.S. Appl. No. 17/219,574, filed Mar. 31, 2021, Zhang et al.
(Continued)

*Primary Examiner* — Huawen A Peng
(74) *Attorney, Agent, or Firm* — Fish & Richardson P.C.

(57) ABSTRACT

Disclosed herein are methods, systems, and apparatus, including computer programs encoded on computer storage media, for managing transaction requests in ledger systems. One of the methods includes: receiving a plurality of transaction requests by a computing system, each of the plurality of transaction requests including content information of a corresponding transaction and authentication information of the corresponding transaction, storing each of the plurality of transaction requests in a request stream by the computing system, obtaining storage information of a transaction request of the plurality of transaction requests in the request stream by the computing system, and storing the storage information of the transaction request in an index of an index stream and authentication information of a transaction corresponding to the transaction request in a storage element of a storage stream by the computing system, the storage element corresponding to the index, the index stream being associated with the storage stream.

20 Claims, 9 Drawing Sheets

(51) Int. Cl.
  *H04L 9/32* (2006.01)
  *H04L 9/40* (2022.01)

(56) References Cited

U.S. PATENT DOCUMENTS

| | | |
|---|---|---|
| 6,823,456 B1 | 11/2004 | Dan et al. |
| 7,697,920 B1 | 4/2010 | McClain |
| 8,392,709 B1 | 3/2013 | Agrawal |
| 8,468,320 B1 | 6/2013 | Stringham |
| 8,843,645 B2 | 9/2014 | Annamalaisami et al. |
| 9,294,479 B1 | 3/2016 | Koulomzin |
| 10,102,526 B1 | 10/2018 | Madisetti et al. |
| 10,108,954 B2 | 10/2018 | Dunlevy et al. |
| 10,250,708 B1 | 4/2019 | Carver et al. |
| 10,320,569 B1 | 6/2019 | Wentz et al. |
| 10,396,999 B2 | 8/2019 | Zhang |
| 10,419,209 B1 | 9/2019 | Griffin et al. |
| 10,476,665 B1 | 11/2019 | Griffin et al. |
| 10,511,447 B1 | 12/2019 | Lakk |
| 10,523,447 B2 | 12/2019 | Yag |
| 10,581,591 B1 | 3/2020 | Branton |
| 10,581,847 B1 | 3/2020 | Sun et al. |
| 10,608,829 B1 | 3/2020 | Yoshihama et al. |
| 10,728,046 B1 | 7/2020 | Yang et al. |
| 10,742,423 B1 | 8/2020 | Yan et al. |
| 10,749,696 B1 | 8/2020 | Li et al. |
| 10,790,988 B1 | 9/2020 | Li et al. |
| 10,810,508 B1 | 10/2020 | Maximo |
| 10,880,105 B1 | 12/2020 | Li et al. |
| 10,904,013 B2 | 1/2021 | Li et al. |
| 10,904,017 B2 | 1/2021 | Li et al. |
| 10,924,288 B2 | 2/2021 | Yan et al. |
| 2002/0107811 A1 | 8/2002 | Jain et al. |
| 2003/0147536 A1 | 8/2003 | Andivahis et al. |
| 2004/0025057 A1 | 2/2004 | Cook |
| 2005/0223231 A1 | 10/2005 | Zhang et al. |
| 2009/0063854 A1 | 3/2009 | Parkinson |
| 2014/0040058 A1 | 2/2014 | Aklian |
| 2014/0095887 A1 | 4/2014 | Nayshtut et al. |
| 2014/0269776 A1 | 9/2014 | Bomfim et al. |
| 2014/0298034 A1 | 10/2014 | Watanabe et al. |
| 2015/0188715 A1 | 7/2015 | Castellucci et al. |
| 2015/0254344 A1 | 9/2015 | Kulkarni et al. |
| 2015/0286695 A1 | 10/2015 | Kadayam et al. |
| 2015/0295720 A1 | 10/2015 | Buldas et al. |
| 2015/0324789 A1 | 11/2015 | Dvorak et al. |
| 2016/0085955 A1 | 3/2016 | Lerner |
| 2016/0203477 A1* | 7/2016 | Yang .................. G06Q 20/3678 705/69 |
| 2016/0371509 A1 | 12/2016 | Unitt |
| 2017/0005804 A1 | 1/2017 | Zinder |
| 2017/0054672 A1 | 2/2017 | Dennis et al. |
| 2017/0126702 A1 | 5/2017 | Krishnamurthy |
| 2017/0163733 A1 | 6/2017 | Grefen et al. |
| 2017/0171183 A1 | 6/2017 | Lingappa |
| 2017/0200244 A1 | 7/2017 | Aggarwal et al. |
| 2017/0249482 A1 | 8/2017 | Takaai et al. |
| 2017/0300901 A1* | 10/2017 | Kote .................. G06Q 20/3829 |
| 2017/0330179 A1 | 11/2017 | Song et al. |
| 2017/0346693 A1 | 11/2017 | Dix et al. |
| 2017/0353320 A1 | 12/2017 | Yang |
| 2017/0373859 A1 | 12/2017 | Shors et al. |
| 2018/0040007 A1 | 2/2018 | Lane et al. |
| 2018/0091524 A1 | 3/2018 | Setty et al. |
| 2018/0101684 A1 | 4/2018 | Murphy et al. |
| 2018/0121923 A1 | 5/2018 | Uhr et al. |
| 2018/0165461 A1 | 6/2018 | Unitt |
| 2018/0181768 A1 | 6/2018 | Leporini et al. |
| 2018/0189312 A1 | 7/2018 | Alas et al. |
| 2018/0191502 A1 | 7/2018 | Karame |
| 2018/0198631 A1 | 7/2018 | Yang |
| 2018/0218779 A1 | 8/2018 | Collins, Jr. |
| 2018/0253464 A1 | 9/2018 | Kohli et al. |
| 2018/0260212 A1 | 9/2018 | Wisnovsky |
| 2018/0276626 A1* | 9/2018 | Laiben .................. G06Q 20/02 |
| 2018/0322491 A1 | 11/2018 | Madisetti et al. |
| 2018/0330342 A1* | 11/2018 | Prakash .................. G06Q 20/10 |
| 2018/0367310 A1 | 12/2018 | Leong et al. |
| 2018/0374094 A1 | 12/2018 | Kohli |
| 2019/0007437 A1 | 1/2019 | Smelker et al. |
| 2019/0020471 A1 | 1/2019 | Santilli et al. |
| 2019/0073510 A1 | 3/2019 | West et al. |
| 2019/0074974 A1 | 3/2019 | Ganesan et al. |
| 2019/0079950 A1 | 3/2019 | Ramabaja |
| 2019/0080392 A1 | 3/2019 | Youb et al. |
| 2019/0095585 A1 | 3/2019 | Jawaharlal et al. |
| 2019/0102409 A1 | 4/2019 | Shi et al. |
| 2019/0104102 A1 | 4/2019 | Khan et al. |
| 2019/0116034 A1 | 4/2019 | Sengupta |
| 2019/0116185 A1 | 4/2019 | Nagai et al. |
| 2019/0130287 A1 | 5/2019 | Yeoh et al. |
| 2019/0130387 A1 | 5/2019 | Arora et al. |
| 2019/0130416 A1 | 5/2019 | Boudville et al. |
| 2019/0158274 A1 | 5/2019 | Tormasov et al. |
| 2019/0188710 A1 | 6/2019 | Mittal et al. |
| 2019/0190720 A1 | 6/2019 | Falk |
| 2019/0208422 A1 | 7/2019 | Haleem |
| 2019/0213333 A1 | 7/2019 | Williams et al. |
| 2019/0215159 A1 | 7/2019 | Notani |
| 2019/0236726 A1 | 8/2019 | Unagami |
| 2019/0238316 A1 | 8/2019 | Padmanabhan |
| 2019/0238318 A1 | 8/2019 | Williams et al. |
| 2019/0238327 A1 | 8/2019 | Li et al. |
| 2019/0268466 A1 | 8/2019 | Inoue |
| 2019/0280871 A1 | 9/2019 | Subramanian |
| 2019/0289454 A1 | 9/2019 | Inoue |
| 2019/0303250 A1 | 10/2019 | Smith et al. |
| 2019/0303920 A1 | 10/2019 | Balaraman et al. |
| 2019/0312855 A1 | 10/2019 | Sharma et al. |
| 2019/0322426 A1 | 10/2019 | Verma et al. |
| 2019/0333059 A1 | 10/2019 | Fallah et al. |
| 2019/0347658 A1 | 11/2019 | Haimes et al. |
| 2019/0363873 A1 | 11/2019 | Fry et al. |
| 2019/0370504 A1 | 12/2019 | Edwardsson |
| 2019/0379754 A1 | 12/2019 | Krishnaswamy |
| 2019/0392061 A1 | 12/2019 | Terry et al. |
| 2020/0007311 A1 | 1/2020 | Oberhofer et al. |
| 2020/0012731 A1 | 1/2020 | Deshpande et al. |
| 2020/0026834 A1 | 1/2020 | Vimadalal et al. |
| 2020/0034553 A1 | 1/2020 | Kenyon et al. |
| 2020/0037158 A1 | 1/2020 | Soundararajan et al. |
| 2020/0042497 A1 | 2/2020 | Pillai et al. |
| 2020/0067705 A1 | 2/2020 | Brown et al. |
| 2020/0074410 A1 | 3/2020 | Binder |
| 2020/0076572 A1 | 3/2020 | Irazabal et al. |
| 2020/0076576 A1 | 3/2020 | Ahlback et al. |
| 2020/0076608 A1 | 3/2020 | Irazabal et al. |
| 2020/0076625 A1 | 3/2020 | Kass |
| 2020/0076828 A1* | 3/2020 | Nainar .................. H04L 9/3263 |
| 2020/0082349 A1 | 3/2020 | Maio |
| 2020/0089915 A1 | 3/2020 | Falk |
| 2020/0112442 A1 | 4/2020 | Wentz |
| 2020/0112444 A1 | 4/2020 | Yoshihama et al. |
| 2020/0112445 A1 | 4/2020 | Yoshihama et al. |
| 2020/0112446 A1 | 4/2020 | Yoshihama et al. |
| 2020/0119906 A1 | 4/2020 | Das et al. |
| 2020/0125391 A1 | 4/2020 | Lee et al. |
| 2020/0127811 A1 | 4/2020 | Sridhar et al. |
| 2020/0136831 A1 | 4/2020 | Danielson et al. |
| 2020/0169425 A1 | 5/2020 | Hofatee et al. |
| 2020/0186354 A1 | 6/2020 | Balinsky et al. |
| 2020/0228352 A1 | 7/2020 | Yang et al. |
| 2020/0242597 A1 | 7/2020 | Baretta et al. |
| 2020/0244463 A1 | 7/2020 | Wilson |
| 2020/0273026 A1 | 8/2020 | Soni et al. |
| 2020/0296130 A1 | 9/2020 | Xie |
| 2020/0304326 A1 | 9/2020 | Xie |
| 2020/0344068 A1 | 10/2020 | Yan et al. |
| 2020/0344078 A1 | 10/2020 | Li et al. |
| 2020/0366499 A1 | 11/2020 | Li et al. |
| 2020/0366500 A1 | 11/2020 | Li et al. |
| 2020/0379980 A1 | 12/2020 | Seo et al. |
| 2021/0042296 A1 | 2/2021 | Guan et al. |
| 2021/0103581 A1 | 4/2021 | Lee et al. |

(56) References Cited

U.S. PATENT DOCUMENTS

| | | |
|---|---|---|
| 2021/0157778 A1 | 5/2021 | Li et al. |
| 2021/0157788 A1 | 5/2021 | Du et al. |
| 2021/0273812 A1 | 9/2021 | Hardin et al. |

FOREIGN PATENT DOCUMENTS

| | | |
|---|---|---|
| CN | 108512652 | 9/2018 |
| CN | 108595126 | 9/2018 |
| CN | 108665946 | 10/2018 |
| CN | 108768630 | 11/2018 |
| CN | 108830710 | 11/2018 |
| CN | 108881253 | 11/2018 |
| CN | 108959228 | 12/2018 |
| CN | 108964905 | 12/2018 |
| CN | 109034805 | 12/2018 |
| CN | 109086626 | 12/2018 |
| CN | 109145188 | 1/2019 |
| CN | 109190331 | 1/2019 |
| CN | 109327528 | 2/2019 |
| CN | 109450638 | 3/2019 |
| CN | 109559227 | 4/2019 |
| CN | 109726597 | 5/2019 |
| CN | 109815748 | 5/2019 |
| CN | 109921909 | 6/2019 |
| CN | 110188096 | 8/2019 |
| CN | 110263035 | 9/2019 |
| CN | 110392876 | 10/2019 |
| CN | 110400221 | 11/2019 |
| CN | 110458699 | 11/2019 |
| CN | 110543788 | 12/2019 |
| CN | 110601849 | 12/2019 |
| CN | 110770774 | 2/2020 |
| CN | 10945548 | 3/2020 |
| CN | 110874739 | 3/2020 |
| CN | 110992027 | 4/2020 |
| CN | 111656386 | 9/2020 |
| EP | 3399458 | 11/2018 |
| EP | 3425845 | 1/2019 |
| EP | 3564884 | 11/2019 |
| KR | 20190000578 | 1/2019 |
| TW | 201901479 | 1/2019 |
| TW | M578836 | 6/2019 |
| TW | I666902 | 7/2019 |
| TW | 201933204 | 8/2019 |
| TW | 20193 5299 | 9/2019 |
| WO | WO 2017036546 | 3/2017 |
| WO | WO2018032369 | 2/2018 |
| WO | WO2018076763 | 5/2018 |
| WO | WO2018178750 | 10/2018 |
| WO | WO2019007783 | 1/2019 |
| WO | WO2019024126 | 2/2019 |
| WO | WO2019072280 | 4/2019 |
| WO | WO 2019117651 | 6/2019 |
| WO | WO 2019213781 | 11/2019 |
| WO | WO2019217428 | 11/2019 |
| WO | WO2019228558 | 12/2019 |
| WO | WO2019228573 | 12/2019 |
| WO | WO 2019228573 | 12/2019 |
| WO | WO 2019236638 | 12/2019 |

OTHER PUBLICATIONS

U.S. Appl. No. 17/219,618, filed Mar. 31, 2021, Zhang et al.
Crosby et al., "BlockChain Technology: Beyond Bitcoin," Sutardja Center for Entrepreneurship & Technology Technical Report, Oct. 16, 2015, 35 pages.
Dennis et al., "Rep on the block: A next generation reputation system based on the blockchain," 2015 10th International Conference for Internet Technology and Secured Transactions (ICITST), Dec. 2015, pp. 131-138.
Extended European Search Report in European Application No. 19811396.1, dated Sep. 23, 2020, 6 pages.
Extended European Search Report in European Application No. 19811887.9, dated Sep. 30, 2020, 7 pages.
Extended European Search Report in European Application No. 19812425.7, dated Nov. 11, 2020, 5 pages.
Extended European Search Report in European Application No. 19858712.3, dated Aug. 25, 2020, 8 pages.
Extended European Search Report in European Application No. 19861229.3, dated Sep. 7, 2020, 9 pages.
Gipp et al., "Decentralized Trusted Timestamping using the Crypto Currency Bitcoin," arXivpreprint arXiv: 1502.04015, Feb. 2015, 6 pages.
Kim et al., "A Survey of Scalability Solutions on Blockchain," 2018 International Conference on Information and Communication Technology Convergence, Oct. 2018, pp. 1204-1207.
Nakamoto, "Bitcoin: A Peer-to-Peer Electronic Cash System," www.bitcoin.org, 2005, 9 pages.
PCT International Search Report and Written Opinion in International Application No. PCT/CN2019/104062, dated May 28, 2020, 8 pages.
PCT International Search Report and Written Opinion in International Application No. PCT/CN2019/104063, dated May 28, 2020, 7 pages.
PCT International Search Report and Written Opinion in International Application No. PCT/CN2019/104066, dated May 28, 2020, 9 pages.
PCT International Search Report and Written Opinion in International Application No. PCT/CN2019/104067, dated May 28, 2020, 7 pages.
PCT International Search Report and Written Opinion in International Application No. PCT/CN2019/104068, dated May 29, 2020, 8 pages.
PCT International Search Report and Written Opinion in International Application No. PCT/CN2019/118143, dated Mar. 31, 2020, 7 pages.
PCT International Search Report and Written Opinion in International Application No. PCT/CN2020/086203, dated Jan. 12, 2021, 8 pages.
PCT International Search Report and Written Opinion in International Application No. PCT/CN2020/086204, dated Jan. 20, 2021, 7 pages.
PCT International Search Report and Written Opinion in International Application No. PCT/CN2020/086205, dated Jan. 12, 2021, 8 pages.
Puthal et al., "Everything You Wanted to Know About the Blockchain: Its Promise, Components, Processes, and Problems," IEEE Consumer Electronics Magazine, Jul. 2018, 7(4):6-14.
Stavrou et al., "Verified Time", IEEE Computer Society, Mar. 2017, vol. 50, Issue 3, pp. 78-82.
Szalachowski, "(Short Paper) Towards More Reliable Bitcoin Timestamps", 2018 Crypto Valley Conference on Blockchain Technology, Jun. 2018, 4 pages.
Xu et al., "Making Big Data Open in Edges: A Resource-Efficient Blockchain-Based Approach," IEEE Transactions on Parallel and Distributed Systems, Apr. 2019, 30(4):870-882.
Yang et al., "Blockchain-based publicly verifiable data deletion scheme for cloud storage," Journal of Network and Computer Applications, Dec. 2017, 103:185-193.
U.S. Appl. No. 17/219,618, filed Mar. 31, 2021, Yuan Zhang.
U.S. Appl. No. 17/219,574, filed Mar. 31, 2021, Yuan Zhang.
EP Extended Search Report in European Application No. 20738788.7, dated Jul. 7, 2021, 9 pages.
Extended European Search Report in European Application No. 20739146.7, dated Jun. 23, 2021, 8 pages.
Ali et al., "A Blockchain-Based Decentralized Data Storage and Access Framework for PingER," IEEE Xplore, Aug. 1, 2018, 6 pages.
EP Extended Search Report in European Application No. 20738789.5, dated Sep. 6, 2021, 6 pages.

\* cited by examiner

MANAGING TRANSACTION REQUESTS IN LEDGER SYSTEMS

CROSS-REFERENCE TO RELATED APPLICATIONS

This application is a continuation of PCT Application No. PCT/CN2020/086204, filed on Apr. 22, 2020, which is hereby incorporated by reference in its entirety.

TECHNICAL FIELD

This specification relates to managing transaction requests in ledger systems.

BACKGROUND

A ledger is typically used to record a history of transactions, such as economic and financial activities in an organization. Applications with ledger-like functionality, such as custom audit tables or audit trails created in relational databases, have been built to maintain an accurate history of applications' data. However, building such applications is time-consuming and prone to human error. Also, as the relational databases are not inherently immutable, any changes to the data are hard to track and verify.

Distributed ledger systems (DLSs), which can also be referred to as consensus networks, and/or blockchain networks, enable participating entities to securely, and immutably store data. DLSs are commonly referred to as blockchain networks without referencing any particular user case. Examples of types of blockchain networks can include public blockchain networks, private blockchain networks, and consortium blockchain networks. Blockchain networks perform a consensus process to validate each transaction before the transaction can be added to the blockchain networks, which can be time-consuming, ineffective, and complicated.

Therefore, it would be desirable to develop a ledger system that can effectively and securely manage transaction requests and/or transactions from client devices and provide more efficient ways of verifying immutability, reliability, trustworthiness, and traceability of transaction requests and/or transactions stored in the ledger system.

SUMMARY

Described embodiments of the subject matter can include one or more features, alone or in combination.

For example, in one embodiment, a computer-implemented method includes: receiving a plurality of transaction requests by a computing system, each of the plurality of transaction requests comprising content information of a corresponding transaction and authentication information of the corresponding transaction; storing each of the plurality of transaction requests in a request stream by the computing system; obtaining storage information of a transaction request of the plurality of transaction requests in the request stream by the computing system; and storing the storage information of the transaction request in an index of an index stream and authentication information of a transaction corresponding to the transaction request in a storage element of a storage stream by the computing system, the storage element corresponding to the index, the index stream being associated with the storage stream.

In some embodiments, one or more of these general and specific embodiments may be implemented using a device, a system, a method, or a computer-readable media, or any combination of devices, systems, methods, and computer-readable media. The foregoing and other described embodiments can each, optionally, include one or more of the following embodiments:

In some embodiments, the method further includes returning an index identifier of the index corresponding to the transaction request to a client device.

In some embodiments, the storage information of the transaction request includes: a location of the transaction request in the request stream.

In some embodiments, the method further includes receiving a search request of the transaction request from a client device, the search request comprising an index identifier of the index corresponding to the transaction request; and searching the transaction request in the request stream based on the index corresponding to the index identifier.

In some embodiments, the method further includes retrieving content information of the transaction stored in the request stream according to the index in the index stream.

In some embodiments, the storage information of the transaction request includes an identifier of the request stream among a plurality of request streams, and the location of the transaction request in the request stream includes: an offset of the transaction request in the request stream, and a size of the transaction request.

In some embodiments, the index stream includes a plurality of indexes, each of the plurality of indexes including storage information of a corresponding one of the plurality of transaction requests in the request stream. The storage stream includes a plurality of storage elements, each of the plurality of storage elements including authentication information of the corresponding one of the plurality of transaction requests in the request stream. An order of the plurality of storage elements in the storage stream is same as an order of the plurality of indexes in the index stream.

In some embodiments, the order of the plurality of storage elements in the storage stream is different from an order of the corresponding ones of the plurality of transaction requests in the request stream.

In some embodiments, the storage element corresponding to the index includes the storage element having a one-to-one mapping to the index and the storage element and the index corresponding to the same transaction request.

In some embodiments, the method further includes: selecting the index stream from a plurality of index streams and the storage stream from a plurality of storage streams, where each index stream of the plurality of index stream is associated with a different corresponding storage stream of the plurality of storage streams.

In some embodiments, an index identifier of the index includes an identifier of the index stream among the plurality of index streams and an identifier of the index in the index stream.

In some embodiments, the method further includes: generating a block in a blockchain, the block comprising a series of sequential storage elements in the storage stream, the series of sequential storage elements corresponding to a second plurality of transaction requests, the series of sequential storage elements corresponding to a series of sequential indexes in the index stream.

In some embodiments, the block does not include content information of transactions corresponding to the second plurality of transaction requests.

For example, in another embodiment, a computer-implemented method includes: receiving a first plurality of transaction requests by a ledger proxy, each of the first plurality of transaction requests including content information of a corresponding transaction and authentication information of the corresponding transaction; storing each of a second plurality of transaction requests among the first plurality of transaction requests in a respective request stream of a plurality of request streams by the ledger proxy, a number of the second plurality of transaction requests being no larger than a number of the first plurality of transaction requests; transmitting a storage request for a transaction request stored in a request stream of the plurality of request streams to a ledger server by the ledger proxy, the storage request including storage information of the transaction request in the request stream and authentication information of a transaction corresponding to the transaction request; receiving index information corresponding to the storage request for the transaction request from the ledger server by the ledger proxy, the index information indicating a location of the storage information stored by the ledger server; and transmitting a response for the transaction request to a client device by the ledger proxy, the response including the index information corresponding to the transaction request.

In some embodiments, one or more of these general and specific embodiments may be implemented using a device, a system, a method, or a computer-readable media, or any combination of devices, systems, methods, and computer-readable media. The foregoing and other described embodiments can each, optionally, include one or more of the following embodiments:

In some embodiments, the index information includes an index identifier of an index in an index stream, the index including the storage information of the transaction request.

In some embodiments, the index corresponds to a storage element in a storage stream associated with the index stream, the storage element storing the authentication information of the transaction.

In some embodiments, the method further includes: determining whether the authentication information of the corresponding transaction of each of the first plurality of transaction requests is valid; and performing at least one of: in response to determining that authentication information corresponding to a first transaction request of the first plurality of transaction requests is valid, storing the first transaction request in a respective request stream of the plurality of request streams, or in response to determining that authentication information corresponding to a second transaction request of the first plurality of transaction requests is invalid, determining not to store the second transaction request and returning an error message to a second client device providing the second transaction request.

In some embodiments, the authentication information of the corresponding transaction includes a hash of the corresponding transaction and a signature of the corresponding transaction (e.g., the hash of the corresponding transaction) encrypted by a private key, and determining whether the authentication information of the corresponding transaction is valid includes calculating a public key corresponding to the private key based on the authentication information of the corresponding transaction.

In some embodiments, the storage request for the transaction request includes a public key calculated by the ledger proxy based on the authentication information of the transaction.

In some embodiments, the authentication information of the transaction includes a hash of the transaction, and the method further includes: after receiving the index information from the ledger server, generating a server signature of the transaction (e.g., a server signature of the hash of the transaction), and transmitting the response including the server signature and the index information to the client device.

In some embodiments, the method further includes: transmitting a second storage request for a second transaction request stored in a second request stream of the plurality of request streams to the ledger server by the ledger proxy; determining that no index information for the second transaction request has been received from the ledger server by the ledger proxy; and transmitting an error message to a second client device providing the second transaction request by the ledger proxy.

In some embodiments, determining that no index information for the second transaction request has been received includes: determining that a predetermined time period has lapsed after the transmitting and that there has been no reply from the ledger server.

In some embodiments, determining that no index information for the second transaction request has been received includes: determining that a reply from the ledger server indicates that the ledger server fails to store at least one of storage information of the second transaction request or authentication information in the second transaction request.

In some embodiments, the second storage request includes a public key calculated by the ledger proxy based on authentication information in the second transaction request, and determining that no index information for the second transaction request has been received includes: determining a reply from the ledger server indicating that the public key is not authorized to access a second index stream and a second storage stream that correspond to the second transaction request.

In some embodiments, the method further includes: marking the second transaction request as trash in the second request stream by the ledger proxy.

In some embodiments, the method further includes: concurrently transmitting storage requests for a third plurality of transaction requests stored in the plurality of request streams to one or more ledger servers.

In some embodiments, the method further includes: selecting the ledger server from a plurality of ledger servers based on information of the transaction request.

In some embodiments, the storage information of the transaction request includes: an identifier of the request stream among the plurality of request streams and a location of the transaction request in the request stream.

In some embodiment, the index information includes: an identifier of the index stream among a plurality of index streams and an identifier of the index in the index stream.

For example, in one embodiment, a computer-implemented method includes: receiving a storage request for a transaction request stored in a request stream by a ledger server, the storage request including storage information of the transaction request in the request stream and authentication information of a transaction corresponding to the transaction request; storing the storage information of the transaction request in an index of an index stream by the ledger server; storing the authentication information of the transaction request in a storage element of a storage stream by the ledger server, the storage stream being associated with the index stream, the storage element corresponding to the index; and returning an index identifier of the index for the transaction request by the ledger server.

In some embodiments, one or more of these general and specific embodiments may be implemented using a device, a system, a method, or a computer-readable media, or any combination of devices, systems, methods, and computer-readable media. The foregoing and other described embodiments can each, optionally, include one or more of the following embodiments:

In some embodiments, the storage request includes a public key calculated based on the authentication information of the transaction. The method further includes verifying whether the public key in the storage request is authorized to access the index stream and the storage stream by the ledger server.

In some embodiments, storing the storage information of the transaction request and the authentication information of the transaction is in response to verifying that the public key is authorized.

In some embodiments, the method further includes: storing the public key, together with the authentication information of the transaction, in the storage element of the storage stream by the ledger server.

In some embodiments, verifying whether the public key in the storage request is authorized to access the index stream and the storage stream includes: verifying whether the public key in the storage request matches with an authenticated public key associated with the index stream and the storage stream.

In some embodiments, the method further includes: verifying whether a second public key in a second storage request corresponding to a second transaction request is authorized to access a second index stream and a second storage stream that correspond to the second transaction request by the ledger server; and in response to verifying that the second public key is invalid, returning an error message by the ledger server.

In some embodiments, the method includes: receiving a plurality of storage requests for a plurality of transaction requests stored in the request stream by the ledger server, each storage request including storage information of a respective transaction request in the request stream and authentication information of a transaction corresponding to the respective transaction request; and storing the storage information of the plurality of transaction requests in a plurality of indexes in the index stream and the authentication information of the transactions corresponding to the plurality of transaction requests in a plurality of storage elements in the storage stream by the ledger server, where a storing order of the plurality of indexes in the index stream is same as a storing order of the plurality of storage elements in the storage stream.

In some embodiments, a storing order of the plurality of transaction requests in the request stream is different from the storing order of the plurality of storage elements in the storage stream.

In some embodiments, the storage element has a unique storage identifier among the storage stream, and the index has a unique index identifier among the index stream, the unique storage identifier being identical to the unique index identifier.

In some embodiments, storing the storage information of the transaction request in the index of the index stream is concurrent with storing the authentication information of the transaction in the storage element of the storage stream.

In some embodiments, the ledger server is associated with a plurality of ledgers, each ledger comprising a respective index stream and a respective storage stream associated with the respective index stream. The index identifier of the index includes: an identifier of the index stream among the respective index streams of the plurality of ledgers, and a unique identifier of the index stored in the index stream.

In some embodiments, the method further includes: selecting a ledger including the index stream and the storage stream from the plurality of ledgers based on the storage request by the ledger server.

In some embodiments, the method further includes: retrieving content information of the transaction from the request stream according to the index of the index stream by the ledger server, the transaction request including the content information of the transaction and the authentication information of the transaction that are stored in the request stream.

In some embodiments, the storage information of the transaction request includes: an identifier of the request stream among the plurality of request streams and a location of the transaction request in the request stream.

In some embodiments, the content information of the transaction includes: a header of the transaction that includes a local timestamp and a hash of the transaction, and a body of the transaction that includes payload information of the transaction including at least one of transfer participants, a transfer amount, transfer time, or transfer place, and the authentication information of the transaction includes the hash of the transaction and a client signature of the transaction (e.g., a client signature of the hash of the transaction). The content information can also include meta information.

It is appreciated that methods in accordance with this specification may include any combination of the embodiments described herein. That is, methods in accordance with this specification are not limited to the combinations of embodiments specifically described herein, but also include any combination of the embodiments provided.

The details of one or more embodiments of this specification are set forth in the accompanying drawings and the description below. Other embodiments and advantages of this specification will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
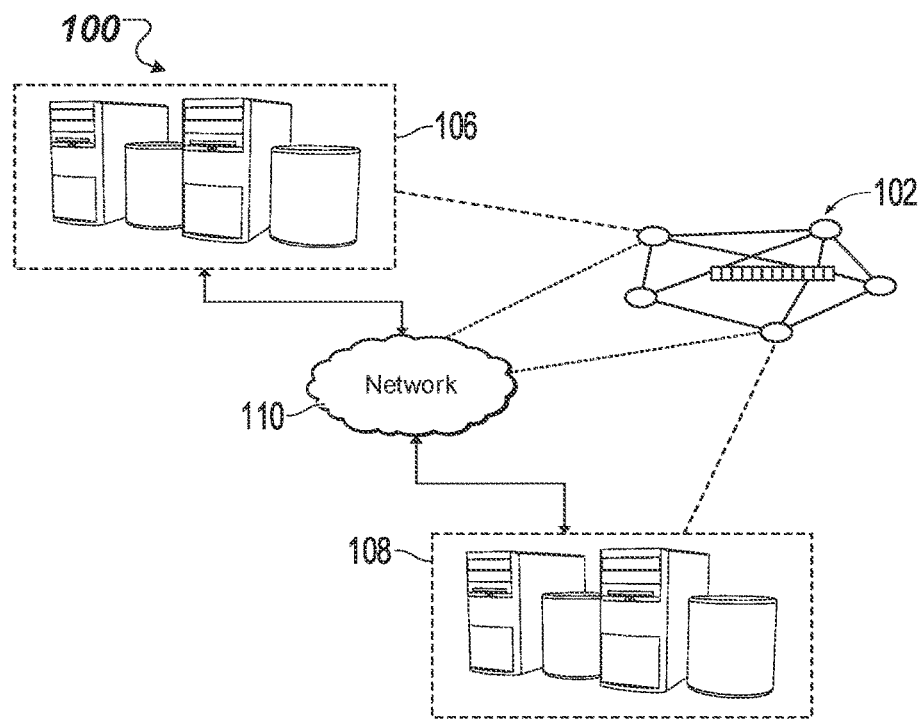
FIG. 1 is a diagram illustrating an example of an environment that can be used to execute embodiments of this specification.

This specification describes technologies for managing transaction requests in ledger systems. These technologies generally involve a ledger system that can be a blockchain-based centralized ledger system that adopts a data structure of a blockchain and/or a blockchain-like data structure to leverage immutability, reliability, trustworthiness, traceability, and verifiability of data stored in the ledger system. In some embodiments, the ledger system can also be a ledger system without blockchains.

In some embodiments, the ledger system can store data as a series of data records (also referred to as records) such as transactions and/or transaction requests. For example, the ledger system can store the transactions and/or transaction requests in a series of blocks in a blockchain data structure. In some embodiments, the ledger system can store the transactions and/or transaction requests in one or more data streams (e.g., referred to as request streams) separately from the blocks in the blockchain. In some embodiments, the ledger system can include other data streams (e.g., referred to index streams and/or storage streams) to store storage/location information, authentication information, or other metadata of the transactions and/or transaction requests. In some embodiments, a data stream can be implemented as an array, a linked list, or another data structure that can store a sequence of data records. For example, the ledger system can first store incoming transaction requests, e.g., received from client devices, in one or more request streams, and obtain storage information of the transaction requests in the request streams. Then the ledger system can store storage information of the transaction requests in the request streams in one or more indexes of an index stream. In some embodiments, the ledger system can store authentication information of the transaction requests in one or more storage elements of a storage stream associated with the index stream. When a number of new storage elements and/or new indexes reaches a predetermined threshold or a predetermined time period elapses, the ledger system can generate a new block of a blockchain storing the new storage elements and/or new indexes in the blockchain. Thus, the ledger system can separate storing the transaction requests from storing the storage elements and indexes associated with the stored transaction requests. In some embodiments, the ledger system can separate storing the transaction requests from generating the blocks storing the storage elements/indexes. Index information of the indexes can be also provided to the client devices for recording and further querying.

The techniques described in this specification produce several technical effects. In some embodiments, the described techniques can provide enhanced security of data stored in the ledger system and improve reliability for storing data (e.g., transaction requests) in the ledger system. For example, by separately storing transaction requests from storing indexes and storage elements and from generating blocks, the transaction requests can be timely stored in the ledger system even if the indexes, storage elements, or blocks are not generated. For example, when a ledger server of the ledger system stops working, e.g., due to a lack of power, and cannot store the indexes and storage elements corresponding to the transaction requests and/or cannot generate the blocks, the transaction requests will not be lost but can be permanently stored in corresponding request streams. In some embodiments, the storage of the transaction requests can be immune from any fault or error of the storage of the storage elements and indexes and/or the generation of the blocks, and allow fast recovery and enhanced robustness of the ledger system.

In some embodiments, the ledger system can improve efficiency and flexibility of data storage. The ledger system can include a ledger proxy and one or more ledger servers. The ledger proxy and the ledger server can be used to perform corresponding functions independently to improve efficiency and reduce interference. For example, the ledger proxy can communicate with client devices and receive transaction requests from the client devices. The ledger proxy can communicate with multiple request streams and concurrently (or in parallel) store the transaction requests in the multiple request streams to improve the storing speed. After obtaining storage information of the stored transaction requests, the ledger proxy can concurrently (or in parallel) transmit storage requests for the stored transaction requests to one or more corresponding ledger servers. Each ledger server can be associated with multiple ledgers. Each ledger can include a respective index stream for storing the storage information of the transaction requests as indexes and a respective storage stream for storing authentication information of the transaction requests as storage elements. The ledger server can then generate blocks storing the storage elements and/or the indexes corresponding to the transaction requests in a blockchain. In some embodiments, by separately using the ledger proxy to store the transaction requests in the request streams and using the ledger server to store the storage information in the index streams and the authentication information in the storage streams, the efficiency and flexibility of the ledger system can be improved.

In some embodiments, the ledger system can improve system performance and/or reduce implementation cost. For example, the ledger system can assign respective functions to the ledger proxy and the ledger servers and strategically allocate suitable hardware and/or software resources to the ledger proxy and the ledger servers for performing their own functions to improve the overall system performance while using reasonable hardware and/or software resources. In some embodiments, because the ledger proxy does not need to generate indexes or blocks, or be involved with intensive or complex computations, the ledger proxy can be implemented with hardware and/or software resources that are specialized in efficient data storage (e.g., with fast I/O speed and large throughput) for storing data (e.g., transaction requests from the client devices) into the data streams, rather than hardware and/or software resources that are specialized in fast computation. On the other hand, the ledger servers can be implemented with hardware and/or software resources that have a relatively large computational power.

Accordingly, the overall performance of the ledger system can be improved without demanding requirements on both storage and computational powers of the hardware and/or software resources. As a whole, the ledger system can provide improved response speed to the client devices and improve a quality of user experience.

In some embodiments, the ledger system can also improve efficiency and capacity of generating blocks for transaction requests. The block generated by the ledger server does not need to include contents of the transactions themselves as the contents have been stored in the request streams. The block may only need to include storage elements that include authentication information corresponding to the transaction requests. Optionally but not necessarily, the block can store indexes corresponding to the storage elements. In this way, a size of the block can be greatly reduced, which can not only increase the generation speed of the blocks but also reduce storage space required for the blocks.

In some embodiments, the ledger system can simplify management of stored transaction requests. Each stored transaction request can be identified by index information of an index that stores storage information of the transaction request (e.g., the location information of the transaction request in the request stream). The storage elements correspond to indexes for the transaction requests. Each index has a one-to-one mapping to a storage element that stores authentication information of the same transaction request. A unique storage identifier of the storage element in a storage stream can be identical to a unique index identifier of the index in an index stream. The index information can include the unique identifier of the index in the index stream and an identifier of the index stream among a number of index stream associated with the ledger server. The ledger server can provide the index information for the transaction request to the ledger proxy. The ledger proxy can provide the index information to a client device providing the transaction request. The ledger server can generate a block storing the storage element. Accordingly, the ledger system can use the index information to identify the index, the storage element, the stored transaction request, and the block. The client device can use the index information to query and retrieve the stored transaction request. Thus, the ledger system can improve the simplicity of managing stored transaction requests. In some embodiments, only the index information for the stored transaction request is communicated between the client device and the ledger system, without detailed information (e.g., content information, authentication information) of the stored transaction request; the security of the stored transaction request can be improved.

In some embodiments, the ledger system can accommodate changes in configurations of underlying data streams, and improve flexibility of storing transaction requests. For example, each stored transaction request can be identified by index information of an index that stores storage information of the transaction request. The index information can include a unique identifier of the index in an index stream and an identifier of the index stream among a number of index stream associated with the ledger server. The storage information can include a location of the transaction request in a corresponding request stream. In some embodiments, the location can include a starting logical or physical address of the transaction request or an offset of the transaction request in the corresponding request stream, and an ending logical or physical address of the transaction request or a size of the transaction request. In some embodiments, the storage information can also include an identifier of the request stream among a number of request streams. In some cases, the ledger system may change the configurations of the request streams, and the location of the transaction request in the request stream may change. Thus, the storage information of the transaction request may also be changed and the index may be updated. However, the index information of the index does not need to be changed. Thus, based on the index information, the updated index (thus the changed storage information) can be identified. Accordingly, the stored transaction request can be still identified and retrieved without changing the index information.

In some embodiments, the ledger system can improve authentication, validity, trustworthiness, and security of stored transaction requests. For example, for each incoming transaction request, the ledger proxy can determine whether authentication information of a transaction corresponding to the transaction request is valid, e.g., by calculating a public key based on the authentication information. The public key can correspond to a private key used for generation of a client signature of the transaction (e.g., a client signature of a hash of the transaction) that is included in the authentication information. If the authentication information is valid, the ledger proxy can store the transaction request in a corresponding request stream. If the authentication information is invalid, the ledger proxy can determine not to store the transaction request. In such a way, the ledger system can ensure that any stored transaction request is valid or authenticated, rather than being fake or modified. Additionally, the ledger proxy does not need to store the unauthenticated transaction request and the ledger server does not need to generate an index and storage element for the unauthenticated transaction request, saving the storage and computational resources of the ledger system.

In some embodiments, the ledger proxy can include the calculated public key in a storage request to the ledger server. The ledger server can verify whether the calculated public key is authorized to access a corresponding ledger having an index stream and a storage stream, e.g., by determining whether the calculated public key matches with an authenticated public key associated with the corresponding ledger. If the calculated public key is determined to be authorized, the ledger server proceeds to store the storage request in the corresponding ledger for the transaction request, e.g., storing the authentication information and the calculated public key in a storage element of the storage stream and the storage information of the transaction request in an index of the index stream.

In some cases, the ledger proxy can generate a server signature using the authorized public key for the stored transaction request and provide the server signature together with index information for the stored transaction request to the client device. The server signature can indicate that the ledger system acknowledges the receipt and/or storage of the transaction request. Thus, the ledger system cannot deny storing the transaction request. If the calculated public key is determined to be unauthorized, the ledger server can refuse to store the storage request for the transaction request and return an error message to the ledger proxy. Accordingly, the ledger server can transmit the error message to a client device providing the transaction request and can mark the stored transaction request as trash in the corresponding request stream. Thus, the ledger system can avoid to store any fake transaction request or any transaction requests modified or hacked by hackers, any improper transaction request, or unauthorized transaction requests from the client devices. Therefore, the ledger system can further improve the authentication, validity, trustworthiness and security of the stored transaction requests, the stored indexes, and the storage elements for the transaction requests.

In some embodiments, the ledger system can improve operation stability, efficiency, and smoothness of managing transaction requests. The ledger system can provide fault tolerance and be robust to abnormities such as, network traffic congestion, power outrage, system failure, or unauthorized transaction requests. For example, if the ledger proxy determines that no index information for a transaction request has been obtained, the ledger proxy can transmit an error message to a client device and/or mark the transaction request as trash in a corresponding request stream. In some cases, the ledger proxy determines that no index information for the transaction request has been received by determining that a predetermined time period has lapsed after transmitting the storage request and that there has been no reply from the ledger server. For example, there may be network traffic congestion that causes a delay for the ledger server receiving the storage request and/or for the ledger proxy receiving the index information from the ledger server. There may be a power outage for the ledger server, and the ledger server may reject any incoming storage request from the ledger proxy and may return a message to the ledger proxy notifying that the ledger server is not working for a period of time. In some cases, the ledger proxy determines that no index information has been received by determining a reply from the ledger server indicates that the ledger server fails to store at least one of storage information of the transaction request or authentication information in the transaction request. For example, there may be no corresponding ledger for the transaction request. In some cases, the ledger proxy determines that no index information for the transaction request has been received by determining a reply from the ledger server indicating that the public key is not authorized to access a ledger corresponding to the transaction request. For example, the transaction request may be faked by a hacker. Therefore, by configuring the ledger proxy and the ledger servers to account for the risks and to minimize or mitigate the effects of the risks, the ledger system can improve the operation stability, efficiency and smoothness.

In some embodiments, the ledger system can be a blockchain-based centralized ledger system that can provide a cryptographically verifiable state-independent data ledger storage with time-critical auditing (with non-repudiation and temper-resistance). In some embodiments, the ledger system can provide ledger services based on a cloud platform featuring centralized endorsement with credibility and neutrality. The ledger system can provide highly reliable and high-performance auditable streaming ledger services by leveraging both a blockchain system's high credibility and a centralized system's high performance and low latency for handling various types of data and logs with auditing requirements, traceability, and tracking.

In some embodiments, the ledger system can include a central trusted authority that provides transparent, immutable, and cryptographically verifiable data that are stored in blocks of a blockchain data structure. In some embodiments, the stored data can be in a log format, including, for example, not only for transaction logs but also other transaction data and block data. Due to the existence of the central trusted authority, the ledger system does not need to perform consensus processes to establish trust, which can result in significant time- and cost-savings. In some embodiments, the ledger system can be more efficient compared to a typical blockchain-based distributed or decentralized ledger system. In some embodiments, the ledger system can provide a cloud-based storage service with enhanced trust, efficiency, and storage performance.

In some embodiments, the ledger system can enhance credibility, auditability, and legality of stored data in the ledger system. For example, the ledger system can interface with a trust time server and provide trust timestamp information of the trust time server to clients of the ledger system. The trust time server is independent from the ledger system. The trust time server can be associated with a third-party trust time authority that provides accurate time services and can be acknowledged or trusted, for example, globally, by the public, auditing entities (such as companies, institutions, or organizations), and/or legal entities (such as courts or governments). As the trustworthiness of the timestamp information provided by the trust time server is acknowledged, integrating the timestamp information of the trust time server into the ledger system for the stored data can further enhance credibility, auditability, and legality of the data stored in the ledger system.

In some embodiments, the ledger system features respective rights of parties or participants of the ledger system. For example, a client of the ledger system can have a right of providing a signature for storing transaction data in the ledger system such that the client cannot repudiate the transaction data. In some embodiments, the ledger system has a right of providing a signature for acknowledging the storage of the transaction data such that the ledger system cannot deny storing the transaction data. In some embodiments, a trust time server has a right of providing a signature for trust timestamp information for the transaction data stored on the ledger system such that the trust time server cannot deny the trust timestamp information. In some embodiments, the three respective rights of the three parties (the client, the ledger system, and the trust time server) are independent from each other. The integration of the three rights and their respective non-repudiation and temper-resistance nature can further enhance creditability and auditability of the transaction data stored in the ledger system.

In some embodiments, the ledger system can provide enhanced orderliness and authenticity of transaction data stored in the ledger system. For example, the ledger system can transmit trust timestamp requests for transaction data stored in the ledger system to the trust time server, and the trust time server can provide trust timestamp information such as timestamps and associated signatures, for example, to authenticate or endorse the time of the transaction data. The ledger system can store the trust timestamp information, e.g., as transactions, in the ledger system.

In some embodiments, the ledger system can store data as a series of data records (also referred to as records) such as transactions or blocks. In some embodiments, the series of records can be linked or anchored together to prevent unauthorized alteration of the stored data. For example, a record may store a unique identifier (e.g., a respective hash) of a preceding record immediately before the record such that any change of the preceding record will result in a change of the unique identifier, which in turn result in a mismatch to the unique identifier stored in the record. This blockchain-like data structure provides a scheme for verifying trustworthiness of the records stored in the ledger system. For example, trustworthiness of a record can be verified by checking whether all record preceding the record can be trustworthily traced back to the origin or initial record (e.g., a genesis transaction in a ledger system or a genesis block in a blockchain).

To provide further context for embodiments of this specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a hash of the previous block. Each block also includes a local timestamp (e.g., provided by a computing device that generates the block or a computing system that manages the blockchain), its own hash, and one or more transactions. For example, the block can include a block header and a block body. The block header can include the local timestamp, its own hash, and a hash of the previous block. The block body can include payload information such as the one or more transactions (or transaction data). The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network.

In general, a consortium blockchain network is private among the participating entities. In a consortium blockchain network, the consensus process is controlled by an authorized set of nodes, which can be referred to as consensus nodes, one or more consensus nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network. In some examples, within a consortium blockchain network, a global blockchain is provided as a blockchain that is replicated across all nodes. That is, all consensus nodes are in perfect state consensus with respect to the global blockchain. To achieve consensus (e.g., agreement to the addition of a block to a blockchain), a consensus protocol is implemented within the consortium blockchain network. For example, the consortium blockchain network can implement a practical Byzantine fault tolerance (PBFT) consensus, described in further detail below.

In some embodiments, a centralized ledger system can also adopt the data structure of a blockchain to leverage immutability, reliability, and trustworthiness of data stored on a blockchain. In some embodiments, such a centralized ledger system can be referred to as a blockchain-based centralized ledger system or a universal auditable ledger service system. In some embodiments, the blockchain-based centralized ledger system can include a central trusted authority that provides transparent, immutable, and cryptographically verifiable data that are stored in blocks of a blockchain data structure. The stored data can be in a log format, including, for example, not only for transaction logs but also other transaction data and block data. Due to the existence of the central trusted authority, the blockchain-based centralized ledger system does not need to perform consensus processes to establish trust. In some embodiments, the blockchain-based centralized ledger system can be more efficient compared to a typical blockchain-based distributed or decentralized ledger system. In some embodiments, the blockchain-based centralized ledger system can provide a cloud-based storage service with enhanced trust, efficiency, and storage performance.

In some embodiments, the centralized ledger system can be a node of a blockchain network. For example, the centralized ledger system can be a non-consensus node in the blockchain network and can provide highly reliable and high-performance auditable streaming ledger services for the consensus nodes or other non-consensus nodes in the blockchain network, or entities outside of the blockchain network.

FIG. 1 is a diagram illustrating an example of an environment 100 that can be used to execute embodiments of this specification. In some examples, the environment 100 enables entities to participate in a consortium blockchain network 102. The environment 100 includes computing systems 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the consortium blockchain network 102. In general, the network 110 represents one or more communication networks. In some cases, the computing systems 106, 108 can be nodes of a cloud computing system (not shown), or each of the computing systems 106, 108 can be a separate cloud computing system including a number of computers interconnected by a network and functioning as a distributed processing system.

In the depicted example, the computing systems 106, 108 can each include any appropriate computing system that enables participation as a node in the consortium blockchain network 102. Examples of computing systems include, without limitation, a server, a desktop computer, a laptop computer, a tablet computing device, and a smartphone. In some examples, the computing systems 106, 108 host one or more computer-implemented services for interacting with the consortium blockchain network 102. For example, the computing system 106 can host computer-implemented services of a first entity (e.g., user A), such as a transaction management system that the first entity uses to manage its transactions with one or more other entities (e.g., other users). The computing system 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing systems 106, 108 provide nodes of the first entity, and second entity respectively, which participate in the consortium blockchain network 102.

Figure 2:
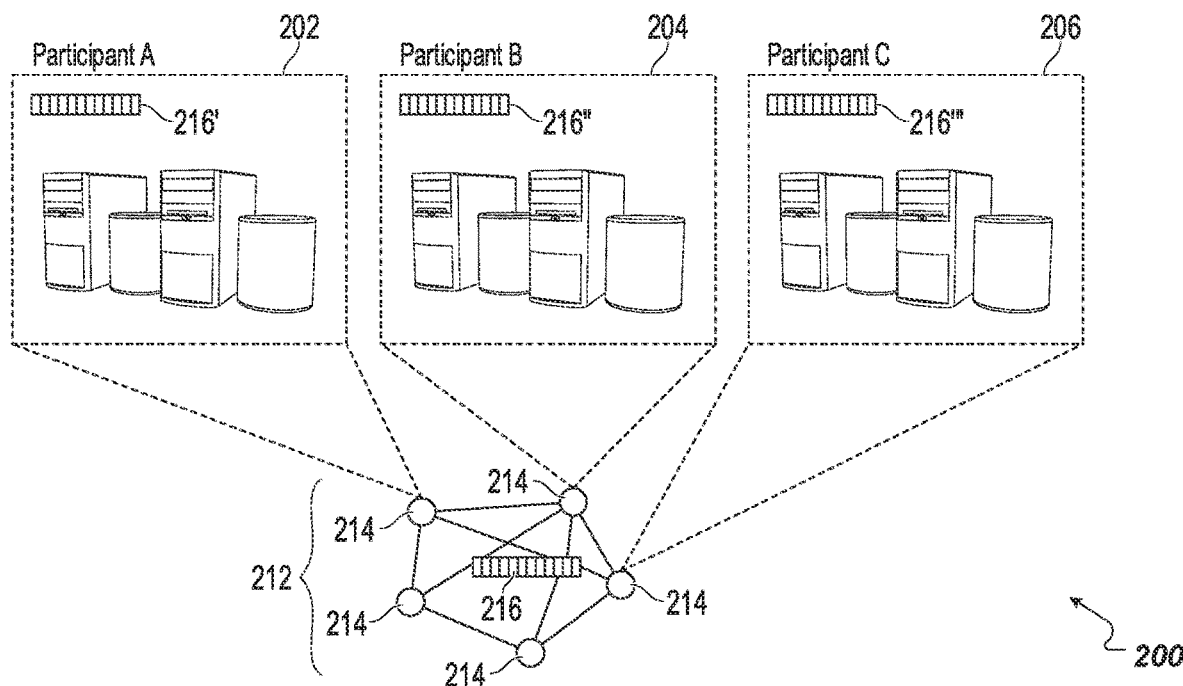
FIG. 2 is a diagram illustrating an example of an architecture in accordance with embodiments of this specification.

FIG. 2 is a diagram illustrating an example of an architecture 200 in accordance with embodiments of the specification. The example conceptual architecture 200 includes participant systems 202, 204, 206 that correspond to Participant A, Participant B, and Participant C, respectively. Each participant (e.g., user, enterprise) participates in a blockchain network 212 provided as a peer-to-peer network including multiple nodes 214, at least some of which immutably record information in a blockchain 216. Although a single blockchain 216 is schematically depicted within the blockchain network 212, multiple copies of the blockchain 216 are provided, and are maintained across the blockchain network 212, as described in further detail herein.

In the depicted example, each participant system 202, 204, 206 is provided by, or on behalf of Participant A, Participant B, and Participant C, respectively, and functions as a respective node 214 within the blockchain network. As used herein, a node generally refers to an individual system (e.g., computer, server) that is connected to the blockchain network 212, and enables a respective participant to participate in the blockchain network. In the example of FIG. 2, a participant corresponds to each node 214. It is contemplated, however, that a participant can operate multiple nodes 214 within the blockchain network 212, and/or multiple participants can share a node 214. In some examples, the participant systems 202, 204, 206 communicate with, or through the blockchain network 212 using a protocol (e.g., hypertext transfer protocol secure (HTTPS)), and/or using remote procedure calls (RPCs).

Nodes 214 can have varying degrees of participation within the blockchain network 212. For example, some nodes 214 can participate in the consensus process (e.g., as miner nodes that add blocks to the blockchain 216), while other nodes 214 do not participate in the consensus process. As another example, some nodes 214 store a complete copy of the blockchain 216, while other nodes 214 only store copies of portions of the blockchain 216. For example, data access privileges can limit the blockchain data that a respective participant stores within its respective system. In the example of FIG. 2, the participant systems 202, 204, and 206 store respective, complete copies 216', 216", and 216''' of the blockchain 216.

A blockchain (e.g., the blockchain 216 of FIG. 2) is made up of a chain of blocks, each block storing data. Examples of data include transaction data representative of a transaction between two or more participants. Transaction data is used as an example of data record stored in the blockchain. Examples of a transaction can include, without limitation, exchanges of something of value (e.g., assets, products, services, currency). In some embodiments, one or more operations executed in the ledger system can be stored as transaction data in the blockchain. For example, the transaction data can include one or more operations or manipulations of data stored in the block chain, information (e.g., timestamp information) obtained from an external resource, or any appropriate data can be stored in a blockchain (e.g., documents, images, videos, audio). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (i.e., the last block added to the blockchain). The consensus node also adds a nonce value, and a timestamp to the block header.

In general, PBFT provides a practical Byzantine state machine replication that tolerates Byzantine faults (e.g., malfunctioning nodes, malicious nodes). This is achieved in PBFT by assuming that faults will occur (e.g., assuming the existence of independent node failures, and/or manipulated messages sent by consensus nodes). In PBFT, the consensus nodes are provided in a sequence that includes a primary consensus node, and backup consensus nodes. The primary consensus node is periodically changed, Transactions are added to the blockchain by all consensus nodes within the blockchain network reaching an agreement as to the world state of the blockchain network. In this process, messages are transmitted between consensus nodes, and each consensus nodes proves that a message is received from a specified peer node, and verifies that the message was not modified during transmission.

In PBFT, the consensus protocol is provided in multiple phases with all consensus nodes beginning in the same state. To begin, a client sends a request to the primary consensus node to invoke a service operation (e.g., execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

Figure 3:
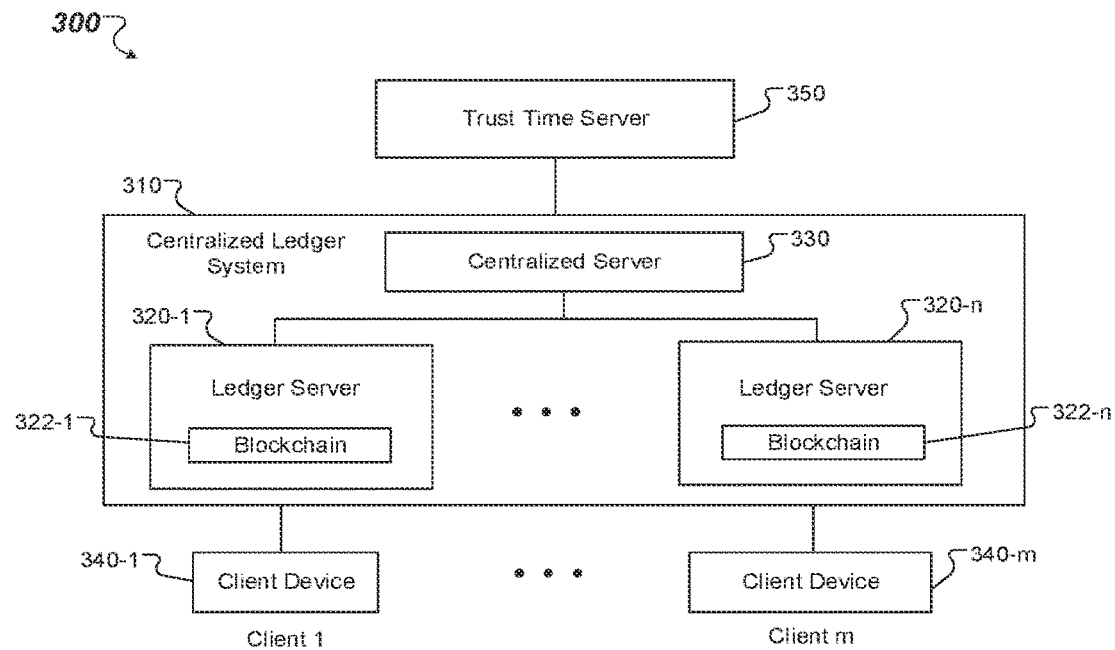
FIG. 3 is a diagram illustrating an example of an environment implementing trust timestamp services in a ledger system in accordance with embodiments of this specification.

FIG. 3 is a diagram illustrating an example of an environment 300 in accordance with embodiments of this specification. The environment 300 implements trust timestamp services in a ledger system 310. For illustration purposes only, a blockchain-based centralized ledger system is described as an example of the ledger system 310. The blockchain-based centralized ledger system 310 adopts a data structure of a blockchain to leverage immutability, reliability, and trustworthiness of data stored on the blockchain. The centralized ledger system 310 can also integrate trust timestamp information from a trust time server 350 that is independent from the centralized ledger system 310 for the data stored on the blockchain, which can greatly enhance credibility, auditability, and legality of the stored data.

In some embodiments, the centralized ledger system 310 can be a cloud computing system including one or more computers interconnected by a network. The centralized ledger system 310 can include any appropriate computing devices. Examples of computing devices include, without limitation, a server, a desktop computer, a laptop computer, a tablet computing device, and a smartphone.

In some examples, the centralized ledger system 310 includes one or more ledger servers 320-1 to 320-n (collectively referred to herein as "320"). Each ledger server 320 can host one or more computer-implemented services for interacting with at least one client, e.g., client 1 or client m. The client can be an individual, a company, an organization, a financial institution, an insurance company, or any other type of entity. In some cases, a client can be associated with one or more ledger servers. In some cases, a ledger server can be associated with one or more clients.

The ledger server 320 can host a transaction management system to provide a ledger service for a client, e.g., client 1 or client m, and the client can use one or more associated devices, e.g., client device 340-1 or 340-m (collectively referred to herein as "340"), to access the transaction management system to use the ledger service. The client device 340 can include any appropriate computing devices.

The ledger service provided by the ledger server 320 can enable a client to store its data in a transparent, immutable, and cryptographically verifiable blockchain data structure, e.g., a blockchain. Each ledger server, e.g., 320-1 or 320-n, can maintain a respective blockchain, e.g., 322-1 to 322-n (collectively referred to herein as "322"). In some embodiments, each ledger server 320 can perform similar functions to those of a blockchain network node (e.g., the computing system 106 or 108 of FIG. 1 or the computing system 202, 204 or 206 of FIG. 2) in a blockchain network. For example, each ledger server 320 can generate blocks and add the blocks to the blockchain 322. In some embodiments, each ledger server 320 can function as a central trusted authority and does not need to perform consensus processes with other nodes (e.g., other client devices or other leger servers) to establish trust. For example, each ledger server 320 can perform similar functions to those of a non-consensus node of a blockchain network. In some embodiments, each ledger server 320 can be the single node that creates and/or manages the blockchain 322.

In some embodiments, each client can be associated with a respective blockchain. In some embodiments, one or more clients can be associated with a same blockchain. In some embodiments, a blockchain can be associated with one or more clients.

In some examples, client 1 is an individual, a company, or an organization. The client device 340-1 associated with client 1 can interact with the ledger server 320-1 to obtain a ledger service of the centralized ledger system 310. For example, the client device 340-1 can access the blockchain 322-1 to read and store transaction data associated with client 1 through the ledger server 320-1. The client device 340-1 can include, for example, any suitable computer, module, server, or computing element programmed to perform methods described herein. In some embodiments, the client device 340-1 can include a user device, such as, a personal computer, a smartphone, a tablet, or other handheld device.

In some examples, client m is an insurance company or a financial institution such as a bank that has a number of individual users. The client device 340-m associated with client m can interact with the ledger server 320-m to provide a ledger service of the centralized ledger system 310 to the individual users of client m. For example, the client device 340-m can access the blockchain 322-m to read and store transaction data associated with client m through the ledger server 320-m. In some cases, a user of client m can request a ledger service of the centralized ledger system 310 through the client device 340-m.

The data stored in a blockchain can be in a log format, including, for example, not only for transaction logs but also other transaction data and block data. Each blockchain stores data in a way that the data is immutable and cannot be altered or deleted. Using cryptography can enable verification that there has been no unintended modification to the stored data. Thus, data recorded on the blockchain are reliable and trustworthy.

The blockchain can include one or more blocks. Each block in the blockchain is linked to a previous block immediately before it in the chain by including a hash of the previous block. Each block also includes a local timestamp, its own hash, and one or more transactions or transaction data. For example, the block can include a block header and a block body. The block header can include the local timestamp, its own hash, and a hash of the previous block. The block body can include payload information such as the one or more transactions or transaction data. The local timestamp indicates a time point or instance when the block is generated and/or added to the blockchain. The local timestamp can be internally provided by the ledger server 320, the centralized ledger system 310, or a central trusted authority associated with the centralized ledger system 310.

In some embodiments, the ledger server 320 sequentially receives a series of transactions associated with a client and then stores the transactions in blocks of a blockchain. In some embodiments, the ledger server 320 can receive one or more transactions, for example, from one or more client devices 340. The received transactions can be stored in a data buffer. The ledger server 320 can generate a block to store the transactions, for example, including transferee and transferor accounts, transaction amounts, or other types of information of the transactions.

In some embodiments, the ledger server 320 can store the transactions in a stream, array, or another data structure (referred to as a transaction storage stream). For example, the transactions can be sequentially stored in the transaction storage stream according to time of occurrence of the transactions. Each transaction can have a respective transaction identifier in the transaction storage stream, for example, according to its time of occurrence. The ledger server 320 can generate blocks to include a number of transactions or a number of hashes for the transactions. In some embodiments, the transactions or the hashes for the transactions can be stored according to the time of occurrence of corresponding transactions, instead of according to values of the hashes. In some embodiments, the hashes for the transactions can be hashes of the transactions or hashes of the respective transaction identifiers of the transactions. A block can include a hash of a previous block immediately before it such that the blocks are anchored with each other to form a blockchain (or a block storage stream). In such a way, the blocks do not store details of the transactions. The details of the transactions can be stored in the transaction storage stream in the ledger server 320 or a separate repository in the centralized ledger system 310.

The ledger server 320 can also provide trust timestamp services to a client. In some embodiments, the ledger server 320 can request trust timestamps from the trust time server 350 for data stored in the ledger server 320, which can enhance credibility, auditability, and legality of the stored data. The trust time server 350 is independent from the centralized ledger system 310. The trust time server 350 can be associated with a third-party trust time authority that provides accurate (or true) time services and can be, for example, globally, acknowledged or trusted by the public, auditing entities (such as companies, institutions, or organizations), and/or legal entities (such as courts or governments). Trust timestamp information provided by the trust time server 350 can be acknowledged or considered as legality without notarization and/or forensic identification. For example, the trust time server 350 can be a UTC (Coordinated Universal Time)/GMT (Greenwich Mean Time) server providing UTC/GMT time services. The trust time server 350 can also be a time server of a trust authority providing standard times for a country or a region.

The centralized ledger system 310 can communicate with the trust time server 350 through a network, e.g., the network 110 of FIG. 1. In response to receiving a timestamp request from a customer, e.g., the ledger server 320, the trust time server 350 can generate a timestamp indicating a time point when receiving the timestamp request. The trust time server 350 can generate a signature to authenticate the timestamp and the timestamp request (e.g., a textual or imaging copy of the timestamp request). For example, the trust time server 350 can use its private key to sign, thus cryptographically encrypting, the timestamp and the timestamp request. The trust time server 350 can generate a digital timestamp certificate including the timestamp and the associated signature and transmit timestamp information including the timestamp certificate to the customer. The trust time server 350 can provide the trust timestamp service with a cost, e.g., $1 per timestamp request.

In some embodiments, the ledger server 320 transmits to the trust time server 350 a timestamp request for authenticating a time of a block in a blockchain. The timestamp request can include information of the block, e.g., a hash of the block. The time server 350 can generate and transmit timestamp information including the timestamp and associated signature for the block or a hash of the timestamp and associated signature. After receiving the timestamp information from the trust time server 350, the ledger server 320 can store the timestamp information or a hash of the timestamp information into a following block immediately subsequent to the block in the blockchain. In some embodiment, the timestamp information can be stored as a transaction in the following block. A block storing the timestamp information can be referred to be a timestamped block. The timestamped block can be a block that includes only the timestamp information, or a block that also include other transactions in addition to the timestamp information. Timestamped blocks in the blockchain can be anchored or linked to each other in the blockchain.

In some embodiment, the ledger server 320 can periodically transmit timestamp requests for to-be-timestamped blocks in a blockchain to the trust time server 350 with a predetermined triggering time period. For example, the ledger server 320 can include a timer counting a time after transmitting a first timestamp request. When the timer counts the predetermined triggering time period, the ledger server 320 can be triggered to transmit a second timestamp request immediately subsequent to the first timestamp request. The centralized ledger system 310 or the ledger server 320 can provide timestamp services with different costs corresponding to different triggering time periods. The triggering time period can be predetermined by a client (or a user) associated with the blockchain or the ledger server 320. For example, the client can choose a timestamp service corresponding to a respective cost and a respective triggering time period.

In some embodiments, the ledger server 320 may not transmit timestamp requests to the trust time server 350 periodically. For example, the ledger server 320 may transmit timestamp requests on demand or based on the number of the blocks generated by the ledger server 320. For example, the ledger server 320 may transmit a timestamp request of a block upon receiving instructions from the client, or upon a predetermined number of blocks have been recently added to the blockchain 322.

In some embodiments, the ledger server 320 may generate blocks periodically at a predetermined time period of block generation. The predetermined triggering time period can be the same or different from the time period of block generation. The predetermined triggering time period can be longer than the time period of block generation so that not every block is being timestamped, for example, due to the cost of obtaining the timestamp from the trust time server 350. In some embodiments, the ledger server 320 may not generate blocks periodically. For example, the ledger server 320 may generate blocks on demand or based on the number of the transactions received by the ledger server 320. For example, the ledger server 320 may generate a new block upon receiving a predetermined number of transactions.

In some embodiment, the ledger server 320 can include one or more application programming interfaces (APIs) that is configured to communicate with the trust time server 350. An API can include a set of subroutine definitions, communication protocols, and tools for building software, and defines functionality provided by a program (module, library) and allows abstraction from exactly how this functionality is implemented. Software components interact with each other through the APIs. In some embodiment, the ledger server 320 can include one or more APIs that can implement functionalities of receiving a hash of a to-be-timestamped block as an input for a timestamp request, transmitting the timestamp request to the trust time server 350, and receiving trust timestamp information, e.g., a digital timestamp certificate or a timestamp and associated signature, sent by the trust time server 350.

The ledger server 320 can include one or more APIs that are configured to communicate with a client device 340 associated with a client. The one or more APIs can implement functionalities such as receiving a request for a timestamp service from the client device 340, listing different timestamp services with different costs and different triggering time periods, receiving a selection among the timestamp services from the client device 340, and transmitting or displaying a corresponding cost with a corresponding triggering time period to the client device 340. In some embodiment, the one or more APIs can also implement functionalities such as receiving a request for verifying or auditing transactions stored on a blockchain associated with the client and transmitting a verification or audition result to the client device 340. As discussed with further details in FIGS. 4A and 4B, the one or more APIs can also implement other functionalities such as receiving transactions or transaction data and client signatures from the client device 340 and transmitting a ledger signature indicating acknowledging the receipt or storage of the transactions or transaction data and/or the client signatures.

In some embodiments, the centralized ledger system 310 includes a centralized server 330. The centralized server 330 can be in communication with the number of ledger servers 320 in the centralized ledger system 310. In some embodiments, the ledger servers 320 communicates with the client devices 340 through the centralized server 330. For example, the centralized server 330 can receive data from a client device 340 and send the data to a ledger server 320 corresponding to (or assigned to) the client device 340.

In some embodiments, the centralized server 330 can maintain a standard time server for the centralized ledger system 310 and can provide internal timestamps (and/or associated signatures) to the ledger servers 320. For example, when a ledger server 320 generates a new block, the ledger server 320 can obtain an internal timestamp (and/or associated signature) from the centralized server 330 and store the internal timestamp (and/or associated signature) in the new block.

In some embodiments, each of the ledger servers 320 communicates with the trust time server 350 through the centralized server 330. For example, the ledger servers 320 can transmit original timestamp requests to the centralized server 330 and the centralized server 330 can transmit the original timestamp requests or centralized server timestamp requests associated with the timestamp requests to the trust time server 350, e.g., through a centralized API in the centralized server 330. The centralized server 330 can provide trust timestamp information obtained from the trust time server 350 to the ledger servers 320. In some other embodiments, as described above, each of the ledger servers 320 can communicate with the trust time server 350 directly without the centralized server 330.

Figure 4A:
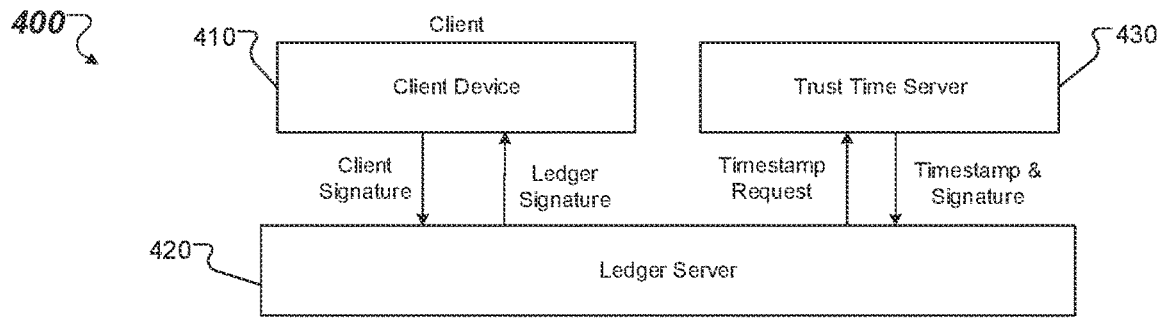
FIG. 4A is a diagram illustrating an example of a ledger system for implementing a trust timestamp service in a single ledger server associated with a single client in accordance with embodiments of this specification.

FIG. 4A is a diagram illustrating an example of a ledger system such as a blockchain-based centralized ledger system 400 for implementing a trust timestamp service in a single ledger server associated with a single client in accordance with embodiments of this specification. The blockchain-based centralized ledger system 400 can include a single ledger server 420 dedicated to provide a ledger service to a single client associated with a client device 410. The blockchain-based centralized ledger system 400 can be an example of the centralized ledger system 310 of FIG. 3. For example, the ledger server 420 can be an example of the ledger server 320-1 of FIG. 3. The client device 410 can be an example of the client device 340-1 of FIG. 3. The client uses the client device 410 to access the ledger service provided by the ledger server 420, in the blockchain-based centralized ledger system 400. The ledger server 420 can also provide a trust timestamp service to the client by communicating with a trust time server 430, which can be, for example, the trust time server 350 of FIG. 3.

The ledger server 420 can provide the ledger service and the trust timestamp service exclusively to the client. The ledger server 420 can store transaction data associated with the client in a blockchain exclusively for the client and independent (or separate) from other clients in the centralized ledger system 400. The ledger server 420 can request and store trust timestamp information exclusively for the transaction data associated with the client stored in the blockchain in the ledger server 420. The client can have an administrative right for storing transactions in the blockchain. In some cases, the client can provide to a third party a secondary ledger right that allows the third party to store transactions in the blockchain associated with the client.

In some embodiments, when a transaction (or transaction data) associated with the client is stored in the ledger server 420, the client can use the client device 410 to transmit a client signature to the ledger server 420. The client signature can indicate that the client acknowledges that the transaction has been completed and/or is to be stored in the ledger server 420. Thus, the client cannot repudiate the transaction.

In some embodiments, after receiving and/or storing the transaction (or the transaction data) in the ledger server 420 (e.g., in a blockchain), the ledger server 420 can transmit a ledger signature to the client device 410. The ledger signature can indicate that the ledger server 420 acknowledges the receipt and/or storage of the transaction. Thus, the ledger server 420 cannot deny storing the transaction.

In some embodiments, the ledger server 420 can transmit to the trust time server 430 a timestamp request for transactions that are associated with the client and stored in the ledger server 420. The trust time server 430 can provide a timestamp and associated signature for the transactions to the ledger server 420. The timestamp signature can include information of the transactions. Thus, the trust time server 430 cannot deny that its endorsement of time of the transactions and the timestamps for the transactions are trustworthy.

In some embodiments, the three respective rights of the three parties (the client, the ledger server, and the trust time server) are independent from each other, which can enhance creditability and auditability of the transaction data stored in the centralized ledger system.

Figure 4B:
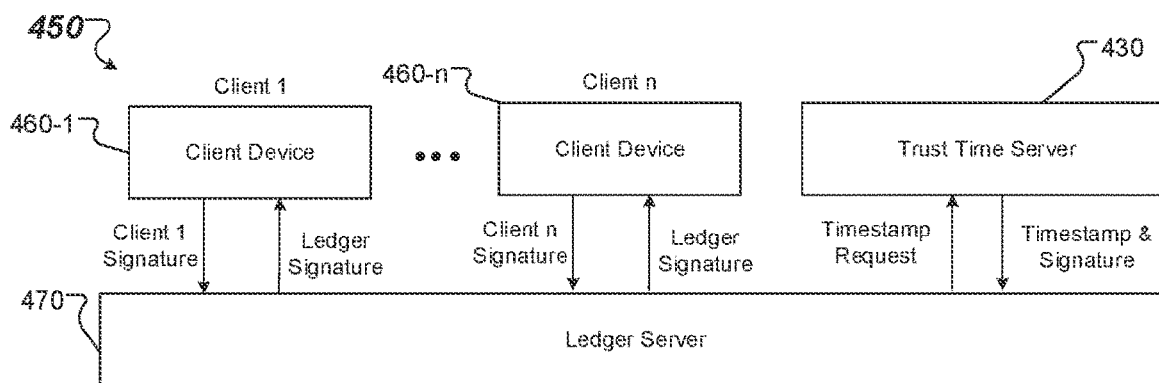
FIG. 4B is a diagram illustrating an example of a ledger system for providing a trust timestamp service to multiple clients by a joint ledger server in accordance with embodiments of this specification.

FIG. 4B is a diagram illustrating an example of a ledger system such as a blockchain-based centralized ledger system 450 for providing a trust timestamp service to multiple clients by a joint ledger server in accordance with embodiments of this specification. The blockchain-based centralized ledger system 450 can include a single joint ledger server 470 for providing a ledger service to multiple clients, client 1 to client n. The blockchain-based centralized ledger system 450 can be another example of the centralized ledger system 310 of FIG. 3. For example, the joint ledger server 470 can be an example of the ledger server 320 of FIG. 3. Each client, client 1 to client n, can be associated with a respective client device, 460-1 to 460-n. In some embodiments, the client devices 460-1 to 460-n can be examples of the client device 340-1 or 340-m of FIG. 3. Each client can use its respective client device 460 to access the ledger service provided by the ledger server 420, in the blockchain-based centralized ledger system 450. As an example, the clients can include multiple financial institutions such as customer banks.

Each client can use its associated client device to store transactions (or transaction data) in a joint blockchain shared with other clients. Similar to FIG. 4A, each client can transmit a respective client signature to the ledger server 470 and the ledger server 470 can return a corresponding ledger signature to the client. The ledger server 470 can transmit timestamp requests for the transactions stored in the joint blockchain to the trust time server 430 and receive and store timestamp information for the transactions in the joint blockchain.

Figure 5:
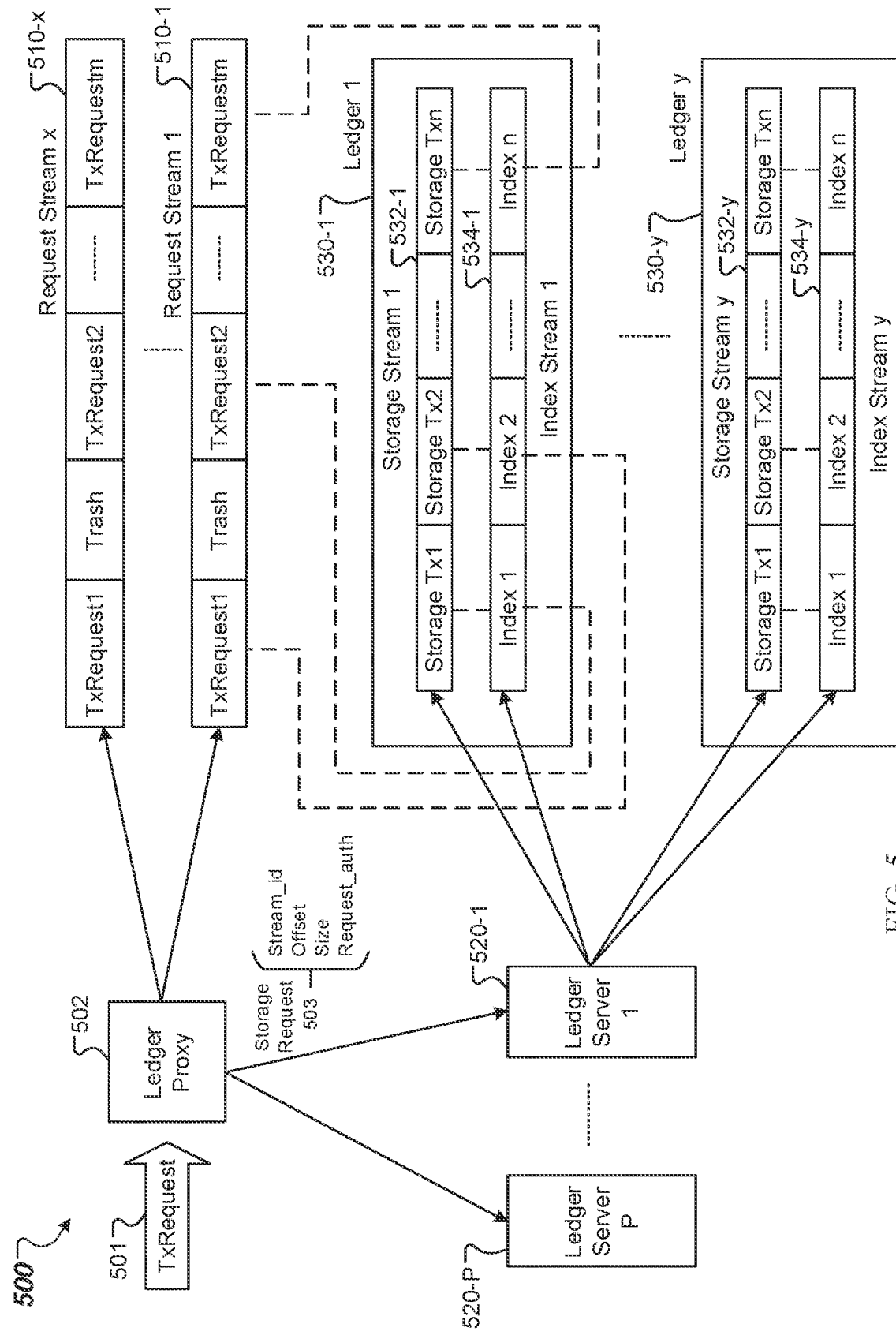
FIG. 5 is a diagram illustrating an example of a ledger system for managing transaction requests in accordance with embodiments of this specification.

FIG. 5 is a diagram illustrating an example of a ledger system 500 for managing transaction requests in accordance with embodiments of this specification. In some embodiments, the ledger system 500 can be a blockchain-based ledger system, such as a consortium blockchain network 102 of FIG. 1 or 212 of FIG. 2, or the blockchain-based centralized ledger system 310 of FIG. 3, 400 of FIG. 4A, or 450 of FIG. 4B. In some embodiments, the ledger system 500 can also instead be a ledger system without blockchains.

The ledger system 500 stores a series of records. Each record can include one or more of a transaction request, a transaction, information associated with the transaction request or transaction in the ledger system, or a block of a blockchain. The ledger system 500 can be configured to separately store transaction requests (e.g., from client devices) in request streams and storage information associated with the transaction requests in corresponding ledgers. The ledger system 500 can be also configured to generate blocks storing information associated with the transaction requests and/or the storage information in a blockchain. The ledger system 500 can be configured to separate storing the transaction requests and/or the storage information from generating the blocks. In such a way, storing the transaction requests in the request streams is not affected by storing the storage information in the ledgers and/or by generating the blocks in the blockchain. Each transaction request can be permanently stored (e.g., by persisting into a disk rather than being caching in a memory), such that the transaction request may not be lost when other components of the ledger system 500 fail to work.

In some embodiments, the ledger system 500 includes a ledger proxy 502. The ledger proxy 502 can be included in a centralized ledger server, e.g., the centralized ledger server 330 of FIG. 3. The ledger proxy 502 can be also externally coupled to the centralized ledger server and in communication with the centralized ledger server. The ledger proxy 502 is configured to communicate with client devices (e.g., the client devices 340 of FIG. 3, the client device 410 of FIG. 4A, or the client devices 460 of FIG. 4B) and to receive transaction requests (TxRequests) 501 from the client devices. Each client device can be associated with a client. Each client can be associated with at least one account in the ledger system 500.

Each transaction request 501 can include content information of a corresponding transaction and authentication information of the corresponding transaction. The content information of the transaction can include a header and a body of the transaction. In some embodiments, the header of the transaction can include a local timestamp and a hash of the transaction. In some embodiments, the body of the transaction can include payload information of the transaction, which can include at least one of transfer participants, a transfer amount, transfer time, or transfer place. The content information can also include metadata or other information. The authentication information of the transaction can include the hash of the transaction and a client signature of the transaction (e.g., a client signature of the hash of the transaction). Note that the client signature of the transaction can include a signature signed on all or part of the transaction or a signature signed on a hash of all or part of the transaction. The client signature can be the client signature as described with respect to FIG. 4A or 4B. In some embodiments, the client signature can be a signature of the hash of the transaction encrypted by a private key, e.g., stored in a client device providing the transaction request.

The ledger proxy 502 can store a transaction request 501 in one of a number of request streams 510-1, . . . , 510-x (collectively referred to herein as "510"). The request streams 510 can be included in the ledger system 500. In some embodiments, the request streams 510 can be externally coupled to the ledger system 500 and in communication with the ledger system 500, e.g., the ledger proxy 502. The request streams 510 can be stored in a storage repository. In some cases, a request stream can correspond to a client account. In some cases, a request stream can correspond to clients from a same geographic region. The request stream can also store transaction requests with any other suitable implementation. Upon receiving a transaction request 501, the ledger proxy 502 can select a corresponding request stream 510 among the number of request streams 510 to store the transaction request 501. The selection can be based on information associated with the transaction request 501, e.g., a client account or a region. The ledger proxy 502 can concurrently (or in parallel or by multiple threads) store transaction requests 501 in the request streams 510.

In some cases, the ledger proxy 502 stores each transaction request received from the client devices in the request streams 510. In some other cases, the ledger proxy 502 verifies authentication of each transaction request before storing the transaction requests in the request streams 510. For example, the ledger proxy 502 can determine whether authentication information in the transaction request is valid.

In some cases, the authentication information can include a hash of a transaction corresponding to the transaction request and a client signature of the transaction. In some embodiments, the client signature is a signature of the hash of the transaction encrypted by a private key. The ledger proxy 502 can determine whether the authentication information is valid by calculating a public key corresponding to the private key based on the authentication information, e.g., based on plain text and ciphertext signed by the private key. If the ledger proxy 502 can obtain the public key based on the calculation, the ledger proxy 502 can determine that the authentication information is valid. If the ledger proxy 502 cannot obtain the public key from the calculation, the ledger proxy 502 can determine that the authentication information is invalid. In response to determining that the authentication information in the transaction request is invalid, the ledger proxy 502 can determine not to store the transaction request in any of the request streams 510 and can return an error message indicating that the transaction request is not authenticated to the client device providing the transaction request. In response to determining that the authentication information in the transaction request is valid, the ledger proxy 502 can store the transaction request in a corresponding request stream 510. In such a way, the ledger system 500 can ensure that any stored transaction request is valid or authenticated, rather than being fake or modified. Additionally, the ledger proxy 502 does not need to store the unauthenticated transaction request and a ledger server does not need to generate an index and storage element for the unauthenticated transaction request (as discussed below), saving the storage and computational resources of the ledger system 500.

In some embodiments, the request stream 510 can be implemented as an array, a linked list, or another data structure that can store a sequence of data records. The request stream 510 can include a number of data elements. The number of data elements can be fixed or can be dynamically changed, for example, upon receiving incoming transaction requests. As shown in FIG. 5, a transaction request can be stored in a data element of the request stream 510. In some embodiments, a data element of the request stream 510 can be empty or null, or can be labeled as trash.

Each request stream can have a corresponding identifier among the number of request streams 510, for example, 1, . . . , X. Each request stream can store a number of transaction requests, e.g., TxRequest1, TxRequest2, . . . , TxRequestm. The number of transaction requests are sequentially stored in the request stream. A location of each transaction request in the request stream can include, for example, a starting logical address (or physical address) or an offset of the transaction request in the request stream and an ending logical address (or physical address) or a size of the transaction request. After storing the transaction request, the request stream 510 can return storage information of the transaction request to the ledger proxy 502. The storage information includes an identifier of the request stream in the number of request streams and a location of the transaction request in the request stream.

After receiving storage information of a transaction request 501 stored in a corresponding request stream 510, the ledger proxy 502 can transmit a storage request 503 for the transaction request 501 to a corresponding ledger server among a number of ledger servers 520-1, 520-2, . . . , 520-P (collectively referred to herein as "520") in the ledger system 500. The storage request 503 can include storage information of the transaction request in the corresponding request stream and authentication information of a transaction corresponding to the transaction request. The storage information can include an identifier of the request stream (stream_id), a location of the transaction request in the request stream, e.g., an offset and a size of the transaction request. The storage request 503 can also include a public key calculated based on the authentication information of the transaction.

The ledger server 520 can be the ledger server 320 of FIG. 3, 420 of FIG. 4A, or 470 of FIG. 4B. Each ledger server 520 can be associated with a number of ledgers 530-1, . . . , 530-$y$ (collectively referred to herein as "530"). For example, the ledger server 520 can manage or communicate with the number of ledgers 530. Each ledger 530 can be associated with a client or a client account. A client can be associated with multiple ledgers 530. The ledger 530 can store information about transactions or transaction requests associated with the client or the client account.

The ledger proxy 502 can select a corresponding ledger server from the number of ledger servers 520 based on information of the transaction request or the storage information of the transaction request in a corresponding request stream. For example, if the transaction request is associated with a client account, the ledger proxy 502 can select the corresponding ledger server 520 communicating with a corresponding ledger 530 associated with the client account. The corresponding ledger server 520 can also select the corresponding ledger 530 from the number of ledgers 530 based on the information of the transaction request or the storage information.

In some cases, the ledger proxy 502 can concurrently transmit multiple storage requests 503 for multiple transaction requests 501 stored in the request streams 510 to one or more corresponding ledger servers 520. For example, the ledger proxy 502 concurrently sends a first storage request corresponding to a first transaction request and a second storage request corresponding to a second transaction request to a ledger server. The ledger server may receive the second storage request prior to the first storage request and can store the second storage request before the first storage request.

Each ledger 530-1, . . . , 530-$y$ can include a corresponding storage stream 532-1, . . . , 532-$y$ (collectively referred to herein as "532") and a corresponding index stream 534-1, . . . , 534-$y$, (collectively referred to herein as "534"). In some embodiments, the storage stream 532 or the index stream 542 can be implemented as an array, a linked list, or another data structure that can store a sequence of data records. The storage stream 532 can include a number of storage elements. The number of storage elements in the storage stream 532 can be fixed or can be dynamically changed. The index stream 542 can include a number of indexes. The number of indexes in the index stream 542 can be fixed or can be dynamically changed. An index in the index stream 542 has a corresponding storage element in the storage stream 532. For example, after receiving a storage request 503 from the ledger proxy 502, the ledger server 520 can store storage information in the storage request 503 in an index of an index stream 534 of a corresponding ledger 530 and store authentication information of a corresponding transaction in the storage request 503 in a storage element of a storage stream 532 of the corresponding ledger 530. Storing the storage information of the transaction request in the index of the index stream 534 can be concurrent with storing the authentication information of the transaction in the storage element of the storage stream 532.

In each ledger 530, the storage stream 532 can sequentially store a number of storage elements, e.g., Storage Tx1, StorageTx2, . . . , Storage Txn, in a storing order. Each storage element has a unique storage identifier, e.g., 1, 2, . . . , n, among the storage stream 532. The index stream 534 can sequentially store a number of indexes, e.g., Index 1, Index 2, . . . , Index n, in a storing order. Each index has a unique index identifier, e.g., 1, 2, . . . , n, among the index stream 534. In some embodiments, the unique storage identifier of a storage element is identical to the unique index identifier of an index corresponding to the storage element. For example, as illustrated in FIG. 5, index 1 corresponds to storage Tx1, and the unique storage identifier 1 of the storage Tx1 is identical to the unique index identifier 1 of the index 1. Thus, based on the unique index identifier of the index in the index stream 534, the storage element can be identified in the storage stream 532. As the index stores the storage information of a corresponding transaction request, based on the unique index identifier of the index in the index stream 534, the index can be identified in the index stream 534, and the storage information can be obtained from the index stream 534. Accordingly, the corresponding transaction request can be retrieved from a corresponding request stream based on the storage information. Thus, the unique index identifier of the index also corresponds to the storage information of the corresponding transaction request in the corresponding request stream. The storage element has a one-to-one mapping to the index, and the storage element and the index correspond to the same transaction request.

In some embodiments, the storing order of the storage elements in the storage stream 532 is the same as the storing order of the indexes in the index stream 534. In some cases, the storing order of the indexes in the index stream 534 is the same as a storing order of transaction requests corresponding to the indexes in a corresponding request stream 510. In some cases, the storing order of the indexes in the index stream 534 is different from the storing order of the transaction requests in the corresponding request stream 510. For example, as illustrated in FIG. 5, TxRequest1 is stored before TxRequest2 in the request stream 510-1. The ledger proxy 502 concurrently sends storage requests of TxRequest1 and TxRequest2 to the ledger server 520-1. Due to a delay, e.g., network traffic, the ledger server 520-1 receives the storage request of TxRequest2 earlier than the storage request of TxRequest1, and stores the storage information of TxRequest2 in index 1 of the index stream 534-1 and the authentication information of TxRequest2 in storage Tx1 of the storage stream 532-1, and stores the storage information of TxRequest1 in index 2 of the index stream 534-1 and the authentication information of TxRequest1 in storage Tx2 of the storage stream 532-1. Thus, the storing order of TxRequest1 and TxRequest2 in the request stream 510-1 is different from the storing order of the corresponding indexes, index 2 and index 1, in the index stream 534-1.

After receiving a storage request for a transaction request stored in a request stream from the ledger proxy 502, a ledger server 520 can select a corresponding ledger 530 (accordingly a corresponding index stream and a corresponding storage stream) based on information associated with the transaction request from the number of ledgers 530. The storage request can include a public key calculated based on authentication information in the transaction request, e.g., by the ledger proxy 502. The ledger server 520 can verify whether the public key in the storage request is authorized to access the ledger 530. In some embodiments, the storage request does not include a public key, e.g., the ledger proxy 502 does not calculate the public key based on the authentication information in the transaction request. The ledger server 520 can itself calculate the public key based on the authentication information in the storage request. If the ledger server 520 cannot obtain the public key, the ledger server 520 can determine that the authentication information in the transaction request is invalid. Accordingly, the ledger server 520 can determine not to store the storage request. The ledger server 520 can return an error message to the ledger proxy 502, and the error message can indicate that the storage request is not stored, the authentication information is invalid, and/or the transaction request stored in the request stream is not authenticated. If the ledger server 520 can obtain the public key, the ledger server 520 can determine that the authentication information in the transaction request is valid. The ledger server can further verify whether the calculated public key is authorized to access the ledger 530.

The ledger 530 can be associated with an authenticated public key, e.g., stored in the ledger 530 and/or the ledger server 520. For example, the ledger 530 is associated with a client account. A client device transmits transaction requests associated with the client account. The client device can store a private key corresponding to the authenticated public key and generate a signature for a corresponding transaction using the private key. The ledger proxy 502 can calculate a public key based on the signature included in the transaction request and transmit a storage request including the public key to the ledger server 520. The ledger server 520 can verify whether the public key in the storage request is authorized to access the ledger 530 by determining whether the public key in the storage request matches with the authenticated public key associated with the ledger 530.

If the ledger server 520 determines that the pubic key in the storage request does not match with the authenticated public key, the ledger server 520 can verify that the public key is not authorized to access the ledger 530. Accordingly, the ledger server 520 can determine not to store the storage request in the ledger 530. The ledger server 520 can return an error message to the ledger proxy 502, and the error message can indicate that the storage request is not stored, the calculated public key is invalid, and/or the transaction request stored in the request stream is not authenticated. In response to receiving the error message for the storage request, the ledger proxy 502 can mark the stored transaction request as trash in the request stream, e.g., as illustrated in request stream 510-1 of FIG. 5. In some embodiments, the storage space for the stored transaction request that is marked as trash can be recycled by the ledger proxy 502. The ledger proxy 502 can also return an error message to a client device providing the transaction request, and the error message can indicate that storing the transaction request fails and/or that the transaction request is not authenticated.

If the ledger server 520 determines that the public key in the storage request matches with the authenticated public key associated with the ledger 530, the ledger server 520 verifies that the public key in the storage request is authorized to access the ledger 530. Accordingly, the ledger server 520 can store storage information in an index of the index stream of the ledger 530 and authentication information and optionally the public key in a storage element of the storage stream of the ledger 530. Thus, the ledger system 500 can avoid to store any fake transaction request or any transaction requests modified or hacked by hackers, any improper transaction request, or unauthorized transaction requests from the client devices.

After successfully storing the storage request including the storage information and the authentication information and/or the calculated public key, the ledger server 520 can transmit index information corresponding to the storage request for the transaction request to the ledger proxy 502.

The index information indicates a location of the storage information stored by the ledger server 520. The index information can include a unique identifier of the index storing the storage information of the transaction request in the index stream 534, and an identifier of the index stream among the number of index streams 534.

After receiving the index information corresponding to the storage request for the transaction request, the ledger proxy 502 can transmit a response for the transaction request to a client device providing the transaction request. The response can include the index information corresponding to the transaction request. In some cases, the ledger proxy 502 can generate a server signature of the transaction (e.g., a server signature of the hash of the transaction), e.g., by using a public key stored in the ledger proxy 502. The server signature can be the ledger signature in FIG. 4A or 4B. The server signature can indicate that the ledger system 500 (e.g., the ledger proxy 502) acknowledges the receipt and/or storage of the transaction request. The response transmitted by the ledger proxy 502 can include the server signature, together with the index information. Thus, the ledger system 500 cannot deny storing the transaction request, which can improve the authentication, validity, trustworthiness and security of the stored transaction requests, the stored indexes, and the storage elements for the transaction requests.

A client device can search historically stored transaction requests using index information corresponding to the transaction requests. For example, the ledger proxy 502 can receive a search request from the client device, the search request including the index information corresponding to the transaction request. The ledger proxy 502 can send the search request to a corresponding ledger server 520. The ledger server 520 can identify an index corresponding to the index information and obtain storage information of the transaction request. Then the ledger server 520 or the ledger proxy 502 can search the transaction request based on storage information stored in the index and retrieve the transaction request (content information and/or authentication information of the transaction request) from a corresponding request stream. The ledger proxy 502 can then provide the retrieved transaction request to the client device.

In some embodiments, as a result, each stored transaction request can be identified by index information of an index that stores storage information of the transaction request. Each index has a one-to-one mapping to a storage element that stores authentication information of the same transaction request. As noted below, each block can store as series of storage elements. Therefore, the ledger system 500 can use the index information to identify the index, the storage element, the stored transaction request, and the block. The client device can use the index information to query and retrieve the stored transaction request. Accordingly, the ledger system 500 can improve the simplicity of managing stored transaction requests. In some embodiments, only the index information for the stored transaction request is communicated between the client device and the ledger system 500, without detailed information (e.g., content information, authentication information) of the stored transaction request; the security of the stored transaction request can be improved.

Moreover, the ledger system 500 can accommodate changes in configurations of underlying data streams, and improve flexibility of storing transaction requests. For example, the ledger system 500 may change the configurations of the request streams 510, and the store locations of the transaction requests in the request streams 510 may change. Thus, the storage information of the transaction requests may also be changed and the indexes may be updated. However, the index information of the indexes do not need to be changed. Thus, based on the index information, the updated indexes (thus the changed storage information) can be identified. Accordingly, the stored transaction requests can be still identified and retrieved without changing the index information.

In some cases, after transmitting a storage request for a transaction request stored in a request stream 510 to a ledger server 520, the ledger proxy 502 determines that no index information for the transaction request has been received from the ledger server. In response to determining that no index information has been received, the ledger proxy 502 can transmit an error message to a client device providing the transaction request. The ledger proxy 502 can also mark the transaction request as trash in the request stream 510.

In some cases, the ledger proxy 502 determines that no index information for the transaction request has been received by determining that a predetermined time period has lapsed after transmitting the storage request and that there has been no reply from the ledger server 520. For example, there may be network traffic congestion that causes a delay for the ledger server 520 receiving the storage request and/or for the ledger proxy 502 receiving the index information from the ledger server 520. Or the ledger server 520 may be out of power. The ledger server 520 can reject any incoming storage request from the ledger proxy 502. The ledger server 520 can also return a message to the ledger proxy 502 notifying that the ledger server 520 is not working during a period of time.

In some cases, the ledger proxy 502 determines that no index information has been received by determining a reply from the ledger server 520 indicates that the ledger server fails to store at least one of storage information of the transaction request or authentication information in the transaction request. For example, there may be no corresponding ledger for the transaction request.

In some cases, the ledger proxy 502 determines that no index information for the transaction request has been received by determining a reply from the ledger server 520 indicating that the public key is not authorized to access a ledger 530 (thus an index stream and a storage stream) corresponding to the transaction request. For example, the transaction request may be faked by a hacker.

Therefore, the ledger system 500 can provide fault tolerance and be robust to abnormalities such as, network traffic congestion, power outrage, system failure, and/or unauthorized transaction requests. By configuring the ledger proxy 502 and the ledger servers 520 to account for the risks and to minimize or mitigate the effects of the risks, the ledger system 500 can improve the operation stability, efficiency and smoothness.

In some embodiments, the ledger server 520 generates blocks in a blockchain for storing the transaction information in the ledger system 500 (e.g., a blockchain-based ledger system). In some embodiments, each block can include a series of sequential storage elements in a storage stream 532 of a ledger 530 corresponding to the ledger server 520. The series of sequential storage elements correspond to a series of sequential indexes in an index stream 534 of the ledger 530. In some embodiments, the block can also include the series of sequential indexes in the index stream. The series of sequential indexes include storage information of a number of transaction requests stored in at least one corresponding request stream 510. Each storage element of the series of sequential storage elements includes authentication information of a corresponding transaction request, and each storage element corresponds to an index including storage information of the corresponding transaction request. The corresponding transaction request includes content information of the corresponding transaction and the authentication information of the corresponding transaction and is stored in the corresponding request stream 510. In some cases, the block does not store the content information of the corresponding transaction, as the content information has been stored in the request streams. The block may only need to include storage elements that include authentication information corresponding to the transaction requests. Optionally but not necessarily, the block can store indexes corresponding to the storage elements. In this way, a size of the block can be greatly reduced, which can not only increase the generation speed of the blocks but also reduce storage space required for the blocks. Thus, the ledger system 500 can improve efficiency and capacity of generating blocks for transaction requests.

The ledger server 520 can be similar to the ledger server 320 of FIG. 3. In some embodiments, the ledger server 520 may generate the blocks periodically at a predetermined time period of block generation. In some embodiments, the ledger server 520 may not generate blocks periodically. For example, the ledger server 520 may generate blocks on demand or based on the number of the storage elements stored in the storage stream 532. For example, the ledger server 520 may generate a new block upon the storage stream 532 stores a predetermined number of new storage elements and/or indexes after the generation of a previous block immediately before the new block. The ledger server 520 generating a block can be independent from the ledger server storing a storage request, and/or independent from the ledger proxy 502 storing a transaction request in a corresponding request stream 510. Similar to the ledger server 320 of FIG. 3, the ledger server 520 can manage the blocks and/or the blockchain, e.g., obtaining timestamp information from a trust time server, e.g., the trust time server 350 of FIG. 3, for the storage elements in the blocks.

As described above, the ledger system 500 can separate storing the transaction requests 501 from storing the storage elements and indexes associated with the stored transaction requests, and can separate storing the transaction requests from generating the blocks storing the storage elements/indexes. By separately storing the transaction requests from storing the indexes and storage elements and from generating the blocks, the transaction requests can be timely stored in the ledger system 500 even if the indexes, storage elements, or blocks are not generated. For example, when a ledger server 520 of the ledger system 500 stops working, e.g., due to a lack of power, and cannot store the indexes and storage elements corresponding to the transaction requests and/or cannot generate the blocks, the transaction requests will not be lost but can be permanently stored in corresponding request streams 510. In some embodiments, the storage of the transaction requests can be immune from any fault or error of the storage of the storage elements and indexes and/or the generation of the blocks, and can allow fast recovery and enhanced robustness of the ledger system.

Also, by separately using the ledger proxy 502 to store the transaction requests in the request streams 510 and using the ledger servers 520 to store the storage information in the index streams 534 and the authentication information in the storage streams 532, the efficiency and flexibility of the ledger system 500 can be improved. Moreover, the ledger system 500 can strategically allocate suitable hardware and/or software resources to the ledger proxy 502 and the ledger servers 520 for performing their own functions to improve the overall system performance while using reasonable hardware and/or software resources. In some embodiments, because the ledger proxy 502 does not need to generate indexes or blocks, or be involved with intensive or complex computations, the ledger proxy 502 can be implemented with hardware and/or software resources that are specialized in efficient data storage (e.g., with fast I/O speed and large throughput) for storing data (e.g., transaction requests from the client devices) into the request streams 510, rather than hardware and/or software resources that are specialized in fast computation. On the other hand, the ledger servers 520 can be implemented with hardware and/or software resources that have a relatively large computational power. Accordingly, the overall performance of the ledger system 500 can be improved without demanding requirements on both storage and computational powers of the hardware and/or software resources. As a whole, the ledger system 500 can provide improved response speed to the client devices and improve a quality of user experience.

Figure 6:
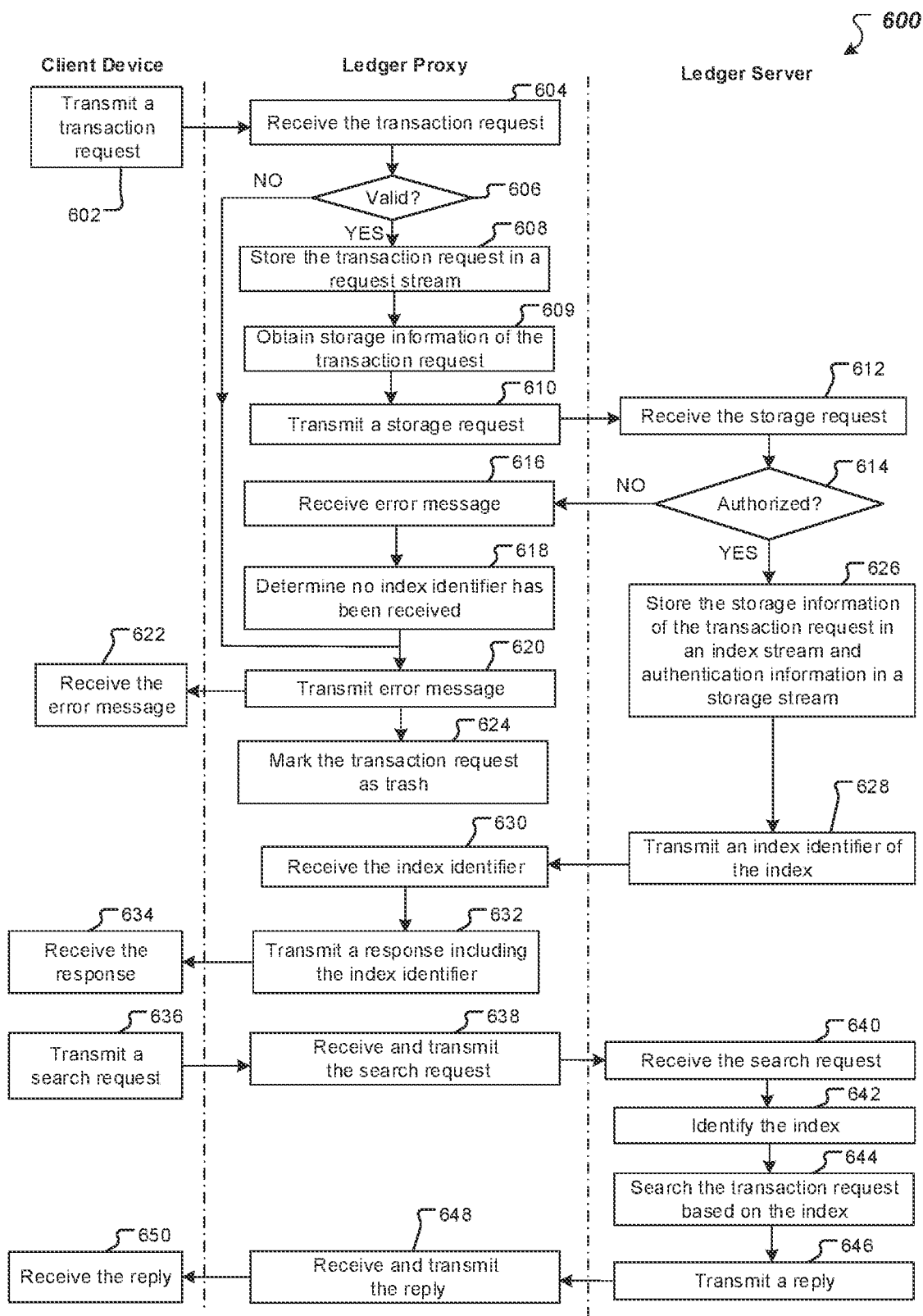
FIG. 6 is a flowchart illustrating an example of a process that can be executed in accordance with embodiments of this specification.

FIG. 6 is a flowchart illustrating an example of a process 600 that can be executed in accordance with embodiments of this specification. The process 600 shows examples of operations for managing transaction requests from a client device in a ledger system having a ledger proxy and a ledger server. The ledger system can be the ledger system 500 of FIG. 5. The ledger proxy can be the ledger proxy 502 of FIG. 5. The ledger server can the ledger server 520 of FIG. 5. The client device can be the client devices 340 of FIG. 3, the client device 410 of FIG. 4A, or the client devices 460 of FIG. 4B.

At 602, the client device transmits a transaction request to the ledger proxy. The transaction request can include content information of a transaction and authentication information of the transaction. The content information of the transaction can include, for example, a header having a local timestamp and a hash of the transaction, and a body having payload information of the transaction. The transaction can include, for example, one or more of an exchange of something of value (e.g., assets, products, services, currency). In some embodiments, a manipulation of data stored in a blockchain (e.g., documents, images, videos, audio), or any appropriate operation that can be executed in the ledger system and stored in a blockchain. As an example, for a transaction that represents a transfer of assets between two transfer participants, the payload information of the transaction can include at least one of transfer participants, a transfer amount, transfer time, transfer place or other information related to the transaction. The authentication information of the transaction can include, for example, the hash of the transaction and a client signature of the transaction (e.g., a client signature of the hash of the transaction). The client signature can be generated, for example, by the client device using a private key associated with a client using the client device.

At 604, the ledger proxy receives the transaction request transmitted from the client device. At 606, after receiving the transaction request, the ledger proxy determines whether the authentication information in the transaction request is valid, e.g., by calculating a public key corresponding to the private key based on the authentication information of the transaction. If the ledger proxy can obtain the public key from the calculation, the ledger proxy can determine that the authentication information is valid; if the ledger proxy cannot obtain the public key from the calculation, the ledger proxy can determine that the authentication information is invalid.

At 608, in response to determining that the authentication information is valid, the ledger proxy stores the transaction request in a request stream, e.g., the request stream 530 of FIG. 5. The ledger proxy can be associated with multiple request streams. In some embodiments, the ledger proxy can concurrently store incoming transaction requests in the multiple request streams. In some embodiments, the ledger proxy can select the request stream based on information of the transaction request or the client device. The request stream can store a number of transaction requests.

At 609, after storing the transaction request in the request stream, the ledger proxy can obtain storage information of the transaction request. The storage information can include a location of the transaction request in the request stream. The location can include, for example, a starting address or an offset of the transaction request in the request stream and a size of the transaction request. In some embodiments, the storage information can also include an identifier of the request stream among the number of request streams.

At 610, the ledger proxy transmits a storage request for the transaction request to the ledger server. The storage request can include the storage information of the transaction request, the authentication information in the transaction request, and the public key calculated by the ledger proxy based on the authentication information. The ledger proxy can communicate with a number of ledger servers. Each ledger server can be associated with one or more ledgers, e.g., the ledgers 530 of FIG. 5. Each ledger can include a corresponding index stream, e.g., the index stream 534 of FIG. 5, and a corresponding storage stream, e.g., the storage stream 532 of FIG. 5. In some embodiments, the ledger proxy can concurrently transmit storage requests for multiple stored transaction requests to one or more ledger servers. In some embodiments, the ledger proxy can select the ledger server among the number of ledger servers based on information of the transaction request or the client device.

At 612, the ledger server receives the storage request from the ledger proxy. At 614, the ledger server verifies whether the public key in the storage request is authorized to access a corresponding ledger. In some embodiments, the ledger server can select the corresponding ledger from a number of ledgers associated with the ledger server based on information of the transaction request or the client device. The ledger server can perform the verification, for example, by determining whether the public key in the storage request matches with an authenticated public key associated with the corresponding ledger, e.g., stored in the ledger server. If the public key in the storage request matches with the authenticated public key, the ledger server can verify that the public key in the storage request is authorized to access the corresponding ledger. If the public key in the storage request does not match with the authenticated public key, the ledger server can verify that the public key in the storage request is not authorized to access the corresponding ledger.

In response to verifying that the public key in the storage request is not authorized to access the corresponding ledger, the ledger server transmits an error message to the ledger proxy. At 616, the ledger proxy receives the error message from the ledger server. At 618, the ledger server determines that no index identifier for the transaction request has been received. At 620, the ledger server transmits an error message indicating that the transaction request is not stored and/or the transaction request is not authenticated. Optionally, at 624, the ledger server can mark the transaction request stored in the request stream as trash. At 622, the client device receives the error message. The client device may transmit a new transaction request to the ledger proxy.

Referring back to step 606, in response to determining that the authentication information in the transaction request is invalid, the ledger proxy can determine not to store the transaction request in the request steam. The process 600 can go to step 620, where the ledger proxy also transmits an error message indicating that the transaction request is not stored and/or the authentication information is invalid.

Referring back to step 614, in response to verifying that the public key in the storage request is authorized to access the corresponding ledger, at 626, the ledger server stores the storage information of the transaction request in an index of an index stream of the corresponding ledger and the authentication information in the transaction request in a storage element of a storage stream of the corresponding ledger. The index corresponds to the storage element, and the index stream is associated with the storage stream. The index stream can include a number of indexes, and the storage stream can include a number of storage elements. An order of the storage elements in the storage stream is same as an order of the indexes in the index stream. The storage element corresponding to the index can include the storage element that has a one-to-one mapping to the index. The storage element and the index correspond to the same transaction request. The storage element can have a unique storage identifier among the storage stream, the index can have a unique index identifier among the index stream, and the unique storage identifier is identical to the unique index identifier. The ledger server can store the storage information of the transaction request in the index of the index stream in concurrence with storing the authentication information of the transaction in the storage element of the storage stream.

At 628, the ledger server transmits an index identifier of the index to the ledger proxy. The index identifier indicates a location of the storage request stored in the ledger. The index identifier can include, for example, an identifier of the index stream among a number of index streams and a unique identifier of the index in the index stream.

At 630, the ledger proxy receives the index identifier of the index for the transaction request from the ledger server. After receiving the index identifier from the ledger server, the ledger proxy can generate a server signature of the transaction (e.g., a server signature of the hash of the transaction) in the authentication information of the transaction request.

At 632, the ledger proxy transmits a response to the client device. The response can include, for example, the index identifier of the index for the transaction request and optionally the server signature.

At 634, the client device receives the response including the index identifier of the index for the transaction request. The client device can determine that the transaction request has been successfully stored in the ledger system and that the index identifier of the index corresponds to storage information of the transaction request in the ledger system. That is, the client device can use the index identifier of the index to retrieve the stored transaction request.

At 636, the client device transmits a search request including the index identifier of the index. At 638, the ledger proxy receives the search request and transmits the search request to the ledger server based on information of the search request and/or the client device. At 640, the ledger server receives the search request. At 642, the ledger server identifies the index based on the index identifier. The index stores storage information of the transaction request in a corresponding request stream. At 644, the ledger server searches the transaction request based on the index (or the storage information). The storage information includes an identifier of the corresponding request stream among a number of request streams and a location of the transaction request in the corresponding request stream. The ledger server can find the transaction request according to the storage information, and retrieve the transaction request from the corresponding request stream. At 646, the ledger server transmits a reply including the retrieved transaction request. At 648, the ledger proxy receives the reply from the ledger server and transmits the reply to the client device. At 650, the client device receives the reply including the retrieved transaction request corresponding to the index identifier in the search request.

Figure 7A:
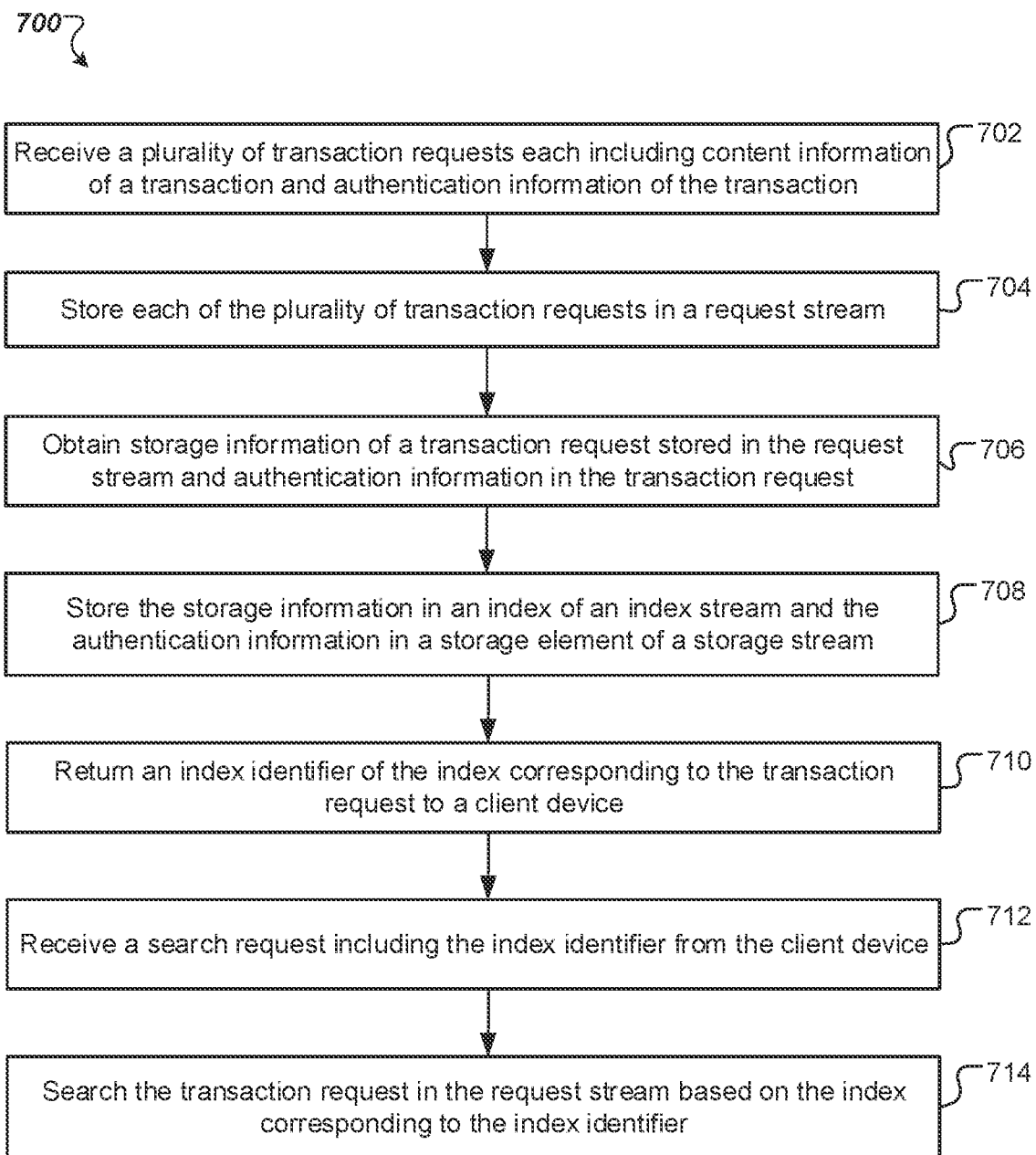
FIG. 7A is a flowchart illustrating an example of a process that can be executed by a ledger system in accordance with embodiments of this specification.

FIG. 7A is a flowchart illustrating an example of a process 700 for managing transaction requests that can be executed by a ledger system in accordance with embodiments of this specification. For convenience, the ledger system is described as a computing system of one or more computers, located in one or more locations, and programmed appropriately in accordance with this specification. The ledger system can be the ledger system 500 of FIG. 5 or the ledger system of FIG. 6. The ledger system can be a blockchain-based ledger system, such as a consortium blockchain network 102 of FIG. 1 or 212 of FIG. 2 or the blockchain-based centralized ledger system 310 of FIG. 3, or a ledger system without blockchains.

At 702, a plurality of transaction requests is received by the ledger system. Each of the transaction requests includes content information of a corresponding transaction and authentication information of the corresponding transaction. The content information of the transaction can include a header having a local timestamp and a hash of the transaction, and a body having payload information of the transaction including at least one of transfer participants, a transfer amount, transfer time, or transfer place. The authentication information of the transaction can include the hash of the transaction and a client signature of the transaction (e.g., a client signature of the hash of the transaction). The client signature can be generated by the client device using a private key associated with a client using the client device. The plurality of transaction requests can be transmitted from one or more client devices.

At 704, each of the plurality of transaction requests is stored in a request stream. The request stream can be the request stream 510 of FIG. 5. The plurality of transaction requests can be sequentially stored in the request stream. Each of the stored transaction requests can have corresponding storage information. The storage information can include a location of the transaction request in the request stream. The location of the transaction request in the request stream can include an offset of the transaction request in the request stream and a size of the transaction request. In some embodiments, the ledger system stores transaction requests in a plurality of request streams. The storage information can also include an identifier of the request stream among the plurality of request streams.

At 706, storage information of a transaction request stored in the request stream and authentication information in the transaction request are obtained.

At 708, the storage information of the transaction request is stored in an index of an index stream and the authentication information is stored in a storage element of a storage stream. The index stream can be the index stream 534 of FIG. 5. The storage stream can be the storage stream 532 of FIG. 5. The index stream is associated with the storage stream. In some cases, the index stream is selected from a plurality of index streams and the storage stream is selected from a plurality of storage streams. Each index stream of the plurality of index stream is associated with a different corresponding storage stream of the plurality of storage streams.

The storage element corresponds to the index. The index stream can include a plurality of indexes, and each of the plurality of indexes can include storage information of a corresponding one of the plurality of transaction requests in the request stream. The storage stream can include a plurality of storage elements, and each of the plurality of storage elements can include authentication information of the corresponding one of the plurality of transaction requests in the request stream. The storage element corresponding to the index can include the storage element having a one-to-one mapping to the index and the storage element and the index corresponding to the same transaction request. An order of the plurality of storage elements in the storage stream is same as an order of the plurality of indexes in the index stream. In some cases, the order of the plurality of storage elements in the storage stream is different from an order of the corresponding ones of the plurality of transaction requests in the request stream.

At 710, an index identifier of the index corresponding to the transaction request is returned to a client device providing the transaction request. The index identifier of the index can include an identifier of the index in the index stream and an identifier of the index stream among the plurality of index streams.

At 712, a search request is received from the client device. The search request includes the index identifier. The index identifier corresponds to the index that stores the storage information of the transaction request.

At 714, the transaction request stored in the request stream is searched based on the index corresponding to the index identifier. The transaction request can be identified, and content information of the transaction corresponding to the transaction request stored in the request stream can be retrieved according to the index in the index stream.

In some implementations, a block is generated in a blockchain. The block can include a series of sequential storage elements in the storage stream. The series of sequential storage elements can correspond to multiple transaction requests. The series of sequential storage elements can correspond to a series of sequential indexes in the index stream. The block does not include content information of transactions corresponding to the multiple transaction requests.

Figure 7B:
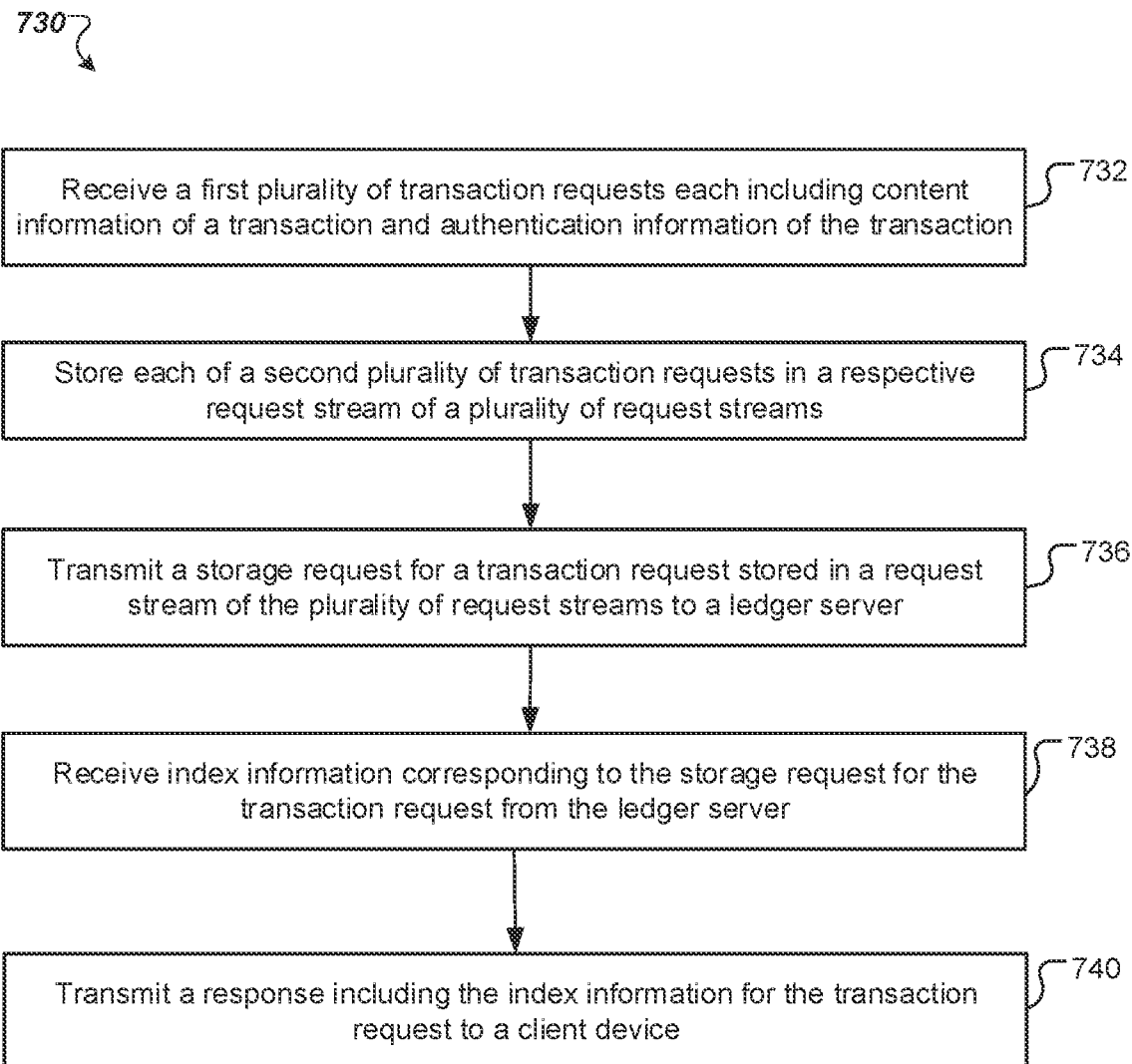
FIG. 7B is a flowchart illustrating an example of a process that can be executed by a ledger proxy in accordance with embodiments of this specification.

FIG. 7B is a flowchart illustrating an example of a process 730 for managing transaction requests that can be executed by a ledger proxy of a ledger system in accordance with embodiments of this specification. For convenience, the ledger system is described as a computing system of one or more computers, located in one or more locations, and programmed appropriately in accordance with this specification. The ledger system can be the ledger system 500 of FIG. 5 or the ledger system of FIG. 6. The ledger proxy can be the ledger proxy 502 of FIG. 5 or the ledger proxy of FIG. 6.

At 732, a first plurality of transaction requests is received by the ledger proxy. Each of the first plurality of transaction requests includes content information of a corresponding transaction and authentication information of the corresponding transaction. The first plurality of transaction requests can be received from one or more client devices.

At 734, each of a second plurality of transaction requests among the first plurality of transaction requests is stored in a respective request stream of a plurality of request streams by the ledger proxy. A number of the second plurality of transaction requests is no larger than a number of the first plurality of transaction requests.

In some embodiments, the ledger proxy determines whether the authentication information of the corresponding transaction of each of the first plurality of transaction requests is valid. The authentication information of the corresponding transaction can include a hash of the corresponding transaction and a signature of the corresponding transaction (e.g., a signature of the hash of the corresponding transaction) encrypted by a private key. In some embodiments, the ledger proxy can determine whether the authentication information of the corresponding transaction is valid by calculating a public key corresponding to the private key based on the authentication information of the corresponding transaction. If the public key is obtained from the calculation, the ledger proxy can determine that the authentication information is valid. If no public key is obtained from the calculation, the ledger proxy can determine that the authentication information is invalid.

In response to determining that authentication information corresponding to a first transaction request of the first plurality of transaction requests is valid, the ledger proxy can store the first transaction request in a respective request stream of the plurality of request streams. In response to determining that authentication information corresponding to a second transaction request of the first plurality of transaction requests is invalid, the ledger proxy can determine not to store the second transaction request and return an error message to a second client device providing the second transaction request. Thus, the number of the stored second plurality of transaction requests can be smaller than or identical to the number of the received first plurality of transaction requests.

At 736, a storage request for a transaction request stored in a request stream of the plurality of request streams is transmitted to a ledger server by the ledger proxy. The ledger server can be the ledger server 520 of FIG. 5 or the ledger server of FIG. 6. The storage request includes storage information of the transaction request in the request stream and authentication information of a transaction corresponding to the transaction request and optionally the calculated public key. The storage information of the transaction request can include an identifier of the request stream among the plurality of request streams and a location of the transaction request in the request stream. The ledger proxy can select the ledger server from a plurality of ledger servers based on information of the transaction request. The ledger proxy can concurrently transmit storage requests for transaction requests stored in the plurality of request streams to the plurality of ledger servers.

At 738, index information corresponding to the storage request for the transaction request from the ledger server is received by the ledger proxy. The index information indicates a location of the storage information stored by the ledger server. The index information can include an index identifier of an index in an index stream, and the index can include the storage information of the transaction request. The index can correspond to a storage element in a storage stream associated with the index stream, and the storage element can store the authentication information of the transaction. In some embodiment, the index information can also include an identifier of the index stream among a plurality of index streams associated with the ledger server.

At 740, a response for the transaction request is transmitted by the ledger proxy to a client device providing the transaction request. The response includes the index information corresponding to the transaction request.

In some embodiments, the authentication information of the transaction includes a hash of the transaction. After receiving the index information from the ledger server, the ledger proxy can generate a server signature of the transaction (e.g., a server signature of the hash of the transaction) and transmit the response including the server signature and the index information to the client device.

In some embodiments, the ledger proxy transmits a second storage request for a second transaction request stored in a second request stream of the plurality of request streams to the ledger server. The ledger proxy can determine whether index information for the second transaction request from the ledger server has been received by the ledger proxy. If the ledger proxy determines that no index information for the second transaction request has been received, the ledger proxy can transmit an error message to a second client device providing the second transaction request. The ledger proxy can also mark the second transaction request as trash in the second request stream.

In some embodiments, the ledger proxy can determine that no index information for the second transaction request has been received by determining that a predetermined time period has lapsed after the transmitting and that there has been no reply from the ledger server.

In some embodiments, the ledger proxy can determine that no index information for the second transaction request has been received by determining that a reply from the ledger server indicates that the ledger server fails to store at least one of storage information of the second transaction request or authentication information in the second transaction request.

In some embodiments, the second storage request includes a public key calculated by the ledger proxy based on authentication information in the second transaction request, and the ledger proxy can determine that no index information for the second transaction request has been received by determining a reply from the ledger server indicating that the public key is not authorized to access a second index stream and a second storage stream that correspond to the second transaction request.

Figure 7C:
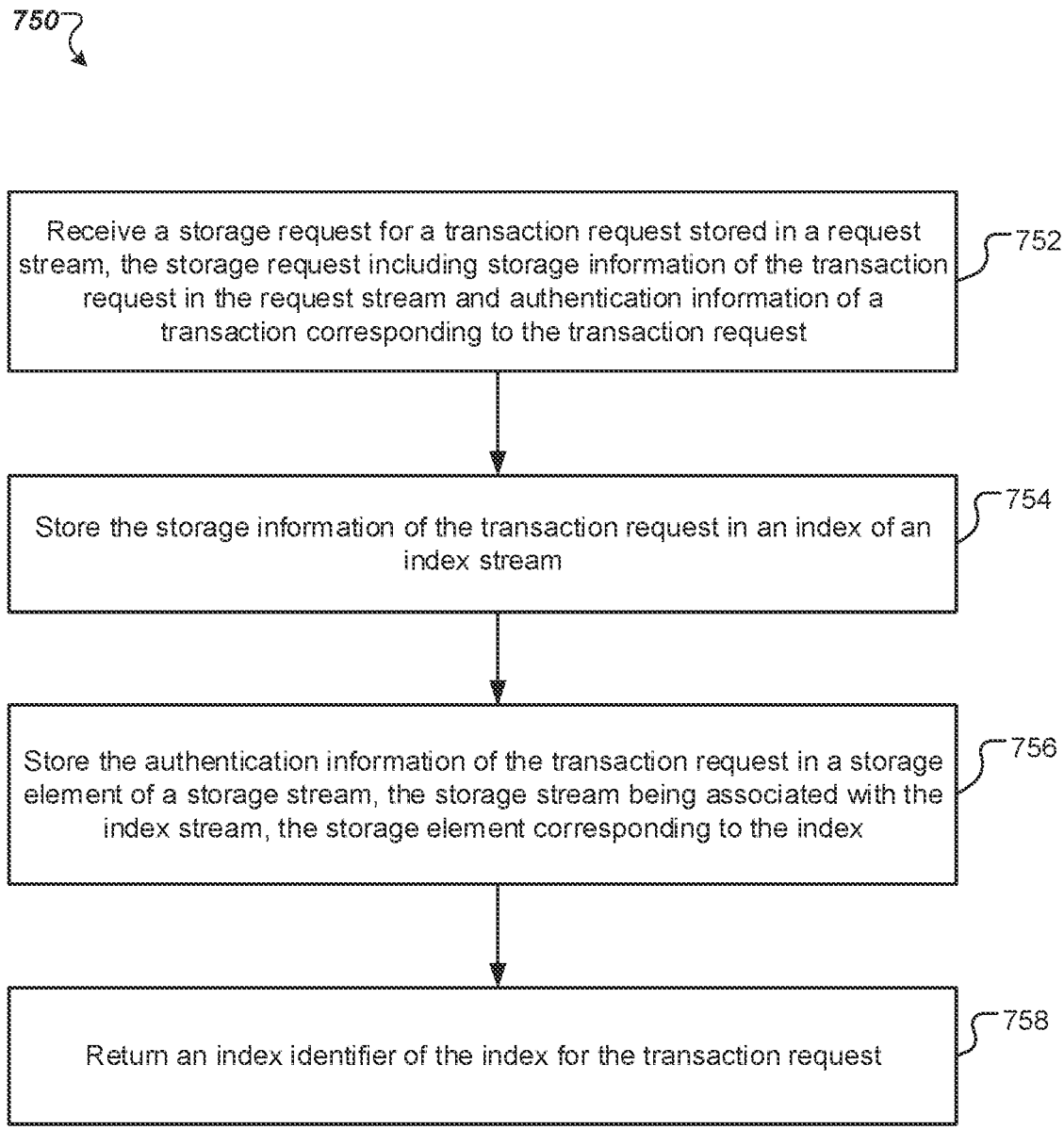
FIG. 7C is a flowchart illustrating an example of a process that can be executed by a ledger server in accordance with embodiments of this specification.

FIG. 7C is a flowchart illustrating an example of a process 750 for managing transaction requests that can be executed by a ledger server of a ledger system in accordance with embodiments of this specification. For convenience, the ledger system is described as a computing system of one or more computers, located in one or more locations, and programmed appropriately in accordance with this specification. The ledger system can be the ledger system 500 of FIG. 5 or the ledger system of FIG. 6. The ledger server can be the ledger server 520 of FIG. 5 or the ledger server of FIG. 6.

At 752, a storage request for a transaction request stored in a request stream is received by the ledger server. The storage request can be transmitted by a ledger proxy of the ledger system. The ledger proxy can be the ledger proxy 502 of FIG. 5 or the ledger proxy of FIG. 6.

The storage request includes storage information of the transaction request in the request stream and authentication information of a transaction corresponding to the transaction request. The storage information of the transaction request can include an identifier of the request stream among a plurality of request streams and a location of the transaction request in the request stream. The transaction request includes the authentication information of the transaction and content information of the transaction. In some embodiments, the content information of the transaction includes: a header of the transaction that includes a local timestamp and a hash of the transaction, and a body of the transaction that includes payload information of the transaction including at least one of transfer participants, a transfer amount, transfer time, or transfer place. The content information can also include meta information. The authentication information of the transaction can include the hash of the transaction and a client signature of the transaction (e.g., a client signature of the hash of the transaction).

At 754, the storage information of the transaction request is stored in an index of an index stream by the ledger server. At 756, the authentication information of the transaction request is stored in a storage element of a storage stream by the ledger server. The storage stream is associated with the index stream, and the storage element corresponds to the index. Storing the storage information of the transaction request in the index of the index stream can be concurrent with storing the authentication information of the transaction in the storage element of the storage stream.

In some embodiments, the storage request includes a public key calculated based on the authentication information of the transaction. Before storing the storage request, the ledger server can verify whether the public key in the storage request is authorized to access the index stream and the storage stream, for example, by verifying whether the public key in the storage request matches with an authenticated public key associated with the index stream and the storage stream. If the public key in the storage request matches with the authenticated public key, the ledger server verifies that the public key in the storage request is authorized to access the index stream and the storage stream. If the public key in the storage request does not match with the authenticated public key, the ledger server verifies that the public key in the storage request is not authorized to access the index stream and the storage stream.

In response to verifying that the public key is not authorized, the ledger server can return an error message to the ledger proxy. In response to verifying that the public key is authorized, the ledger server stores the storage information of the transaction request in the index of the index stream and the authentication information of the transaction in the storage element of the storage stream. The public key matched with the authenticated public key can be stored, together with the authentication information of the transaction, in the storage element of the storage stream.

At 758, an index identifier of the index for the transaction request is returned by the ledger server. The index identifier of the index can include: an identifier of the index stream among a plurality of index streams and a unique identifier of the index stored in the index stream. In some embodiments, the ledger server can retrieve the content information of the transaction from the request stream according to the index of the index stream. For example, the ledger server can receive a search request including the index identifier of the index from a client device or the ledger proxy. The ledger server can obtain the index based on the index identifier and identify the transaction request in the request stream based on storage information of the transaction request in the index.

In some embodiments, the ledger server receives a plurality of storage requests for a plurality of transaction requests stored in a request stream. The ledger server can store storage information of the plurality of transaction requests in a plurality of indexes in the index stream and authentication information of transactions corresponding to the plurality of transaction requests in a plurality of storage elements in the storage stream by the ledger server. In some embodiments, the storage element has a unique storage identifier among the storage stream, and the index has a unique index identifier among the index stream, and the unique storage identifier is identical to the unique index identifier. A storing order of the plurality of indexes in the index stream is same as a storing order of the plurality of storage elements in the storage stream. A storing order of the plurality of transaction requests in the request stream can be different from the storing order of the plurality of storage elements in the storage stream.

In some embodiments, the ledger server is associated with a plurality of ledgers, and each of the ledgers includes a respective index stream and a respective storage stream associated with the respective index stream. The ledger server can select a ledger including the index stream and the storage stream from the plurality of ledgers based on the storage request by the ledger server.

Figure 8A:
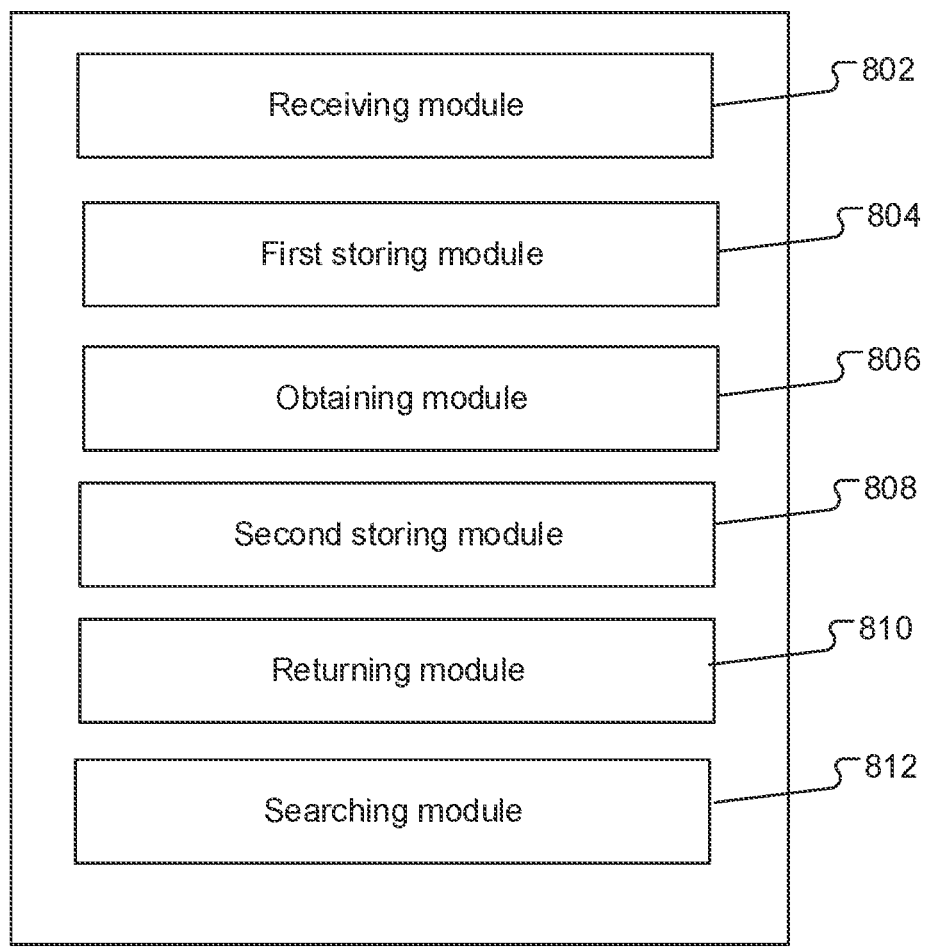
FIG. 8A depicts examples of modules of an apparatus in accordance with embodiments of this specification.

FIG. 8A depicts examples of modules of an apparatus 800 in accordance with embodiments of this specification. The apparatus 800 can be an example of an embodiment of a ledger system configured to store transaction requests in the ledger system. The apparatus 800 can correspond to the embodiments described above, and the apparatus 800 includes the following: a receiving module 802 that receives a plurality of transaction requests by a computing system in the ledger system, each of the plurality of transaction requests including content information of a corresponding transaction and authentication information of the corresponding transaction; a first storing module 804 that stores each of the plurality of transaction requests in a request stream by the computing system; an obtaining module 806 that obtains storage information of a transaction request of the plurality of transaction requests in the request stream by the computing system; and a second storing module 808 that stores the storage information of the transaction request in an index of an index stream and authentication information of a transaction corresponding to the transaction request in a storage element of a storage stream by the computing system, the storage element corresponding to the index, the index stream being associated with the storage stream.

In some embodiments, the apparatus 800 further includes a returning module 810 that returns an index identifier of the index corresponding to the transaction request to a client device.

In some embodiments, the storage information of the transaction request includes a location of the transaction request in the request stream.

In some embodiments, the receiving module 802 receives a search request of the transaction request from the client device, the search request including an index identifier of the index corresponding to the transaction request. The apparatus 800 can further include a searching module 812 that searches the transaction request in the request stream based on the index corresponding to the index identifier.

In some embodiments, the apparatus 800 further includes a retrieving module that retrieves content information of the transaction stored in the request stream according to the index in the index stream.

In some embodiments, the storage information of the transaction request includes an identifier of the request stream among a plurality of request streams, and the location of the transaction request in the request stream includes: an offset of the transaction request in the request stream, and a size of the transaction request.

In some embodiments, the index stream includes a plurality of indexes, each of the plurality of indexes including storage information of a corresponding one of the plurality of transaction requests in the request stream. The storage stream includes a plurality of storage elements, each of the plurality of storage elements including authentication information of the corresponding one of the plurality of transaction requests in the request stream, and an order of the plurality of storage elements in the storage stream is same as an order of the plurality of indexes in the index stream.

In some embodiments, the order of the plurality of storage elements in the storage stream is different from an order of the corresponding ones of the plurality of transaction requests in the request stream.

In some embodiments, the storage element corresponding to the index includes the storage element having a one-to-one mapping to the index and the storage element and the index corresponding to the same transaction request.

In some embodiments, the apparatus 800 further includes a selecting module that selects the index stream from a plurality of index streams and the storage stream from a plurality of storage streams. Each index stream of the plurality of index stream is associated with a different corresponding storage stream of the plurality of storage streams.

In some embodiments, an index identifier of the index includes: an identifier of the index stream among the plurality of index streams and an identifier of the index in the index stream.

In some embodiment, the apparatus 800 further includes a generating module that generates a block in a blockchain, the block including a series of sequential storage elements in the storage stream, the series of sequential storage elements corresponding to a second plurality of transaction requests, the series of sequential storage elements corresponding to a series of sequential indexes in the index stream.

In some embodiments, the block does not include content information of transactions corresponding to the second plurality of transaction requests.

Figure 8B:
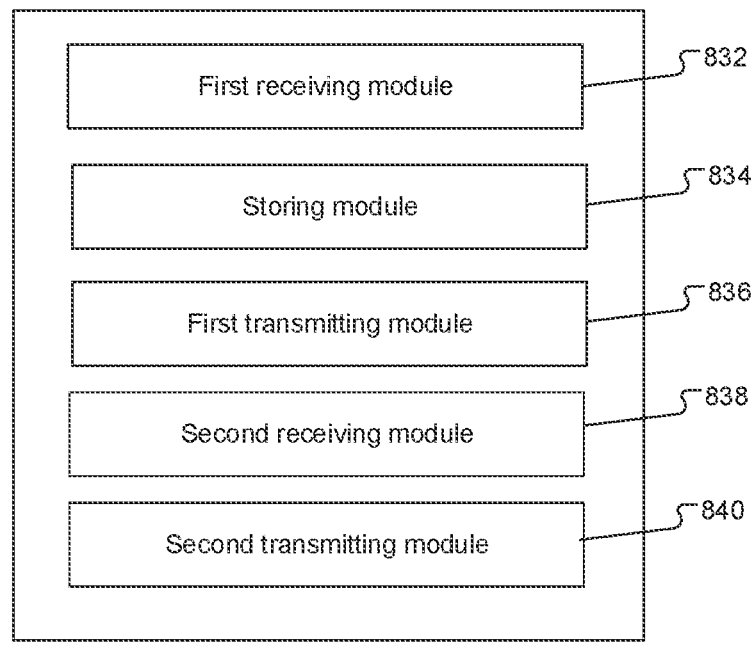
FIG. 8B depicts examples of modules of another apparatus in accordance with embodiments of this specification.

FIG. 8B depicts examples of modules of another apparatus 830 in accordance with embodiments of this specification. The apparatus 830 can be an example of an embodiment of a ledger proxy in a ledger system configured to store transaction requests in the ledger system. The apparatus 830 can correspond to the embodiments described above, and the apparatus 830 includes the following: a first receiving module 832 that receives a first plurality of transaction requests by the ledger proxy in the ledger system, each of the first plurality of transaction requests including content information of a corresponding transaction and authentication information of the corresponding transaction; a storing module 834 that stores each of a second plurality of transaction requests among the first plurality of transaction requests in a respective request stream of a plurality of request streams by the ledger proxy, a number of the second plurality of transaction requests being no larger than a number of the first plurality of transaction requests; a first transmitting module 836 that transmits a storage request for a transaction request stored in a request stream of the plurality of request streams to a ledger server in the ledger system by the ledger proxy, the storage request including storage information of the transaction request in the request stream and authentication information of a transaction corresponding to the transaction request; a second receiving module 838 that receives index information corresponding to the storage request for the transaction request from the ledger server by the ledger proxy, the index information indicating a location of the storage information stored by the ledger server; and a second transmitting module 840 that transmits a response for the transaction request to the client device by the ledger proxy, the response including the index information corresponding to the transaction request.

In some embodiments, the index information includes an index identifier of an index in an index stream, the index including the storage information of the transaction request.

In some embodiments, the index corresponds to a storage element in a storage stream associated with the index stream, the storage element storing the authentication information of the transaction.

In some embodiments, the apparatus 830 further includes a determining module that determines whether the authentication information of the corresponding transaction of each of the first plurality of transaction requests is valid.

In some embodiments, the apparatus 830 further includes a performing module that performs at least one of: in response to determining that authentication information corresponding to a first transaction request of the first plurality of transaction requests is valid, storing the first transaction request in a respective request stream of the plurality of request streams, or in response to determining that authentication information corresponding to a second transaction request of the first plurality of transaction requests is invalid, determining not to store the second transaction request and returning an error message to a second client device providing the second transaction request.

In some embodiments, the authentication information of the corresponding transaction includes a hash of the corresponding transaction and a signature of the corresponding transaction (e.g., a signature of the hash of the corresponding transaction) encrypted by a private key, and the determining module determining whether the authentication information of the corresponding transaction is valid includes calculating a public key corresponding to the private key based on the authentication information of the corresponding transaction.

In some embodiments, the storage request for the transaction request includes a public key calculated by the ledger proxy based on the authentication information of the transaction.

In some embodiments, the authentication information of the transaction includes a hash of the transaction, and the apparatus 830 further includes a generating module that, after receiving the index information from the ledger server, generates a server signature of the transaction (e.g., a server signature of the hash of the transaction), and the second transmitting module transmits the response including the server signature and the index information to the client device.

In some embodiments, the first transmitting module 836 transmits a second storage request for a second transaction request stored in a second request stream of the plurality of request streams to the ledger server by the ledger proxy. The determining module determines that no index information for the second transaction request has been received from the ledger server by the ledger proxy, and the second transmitting module 840 transmits an error message to a second client device providing the second transaction request by the ledger proxy.

In some embodiments, the determining module determines that no index information for the second transaction request has been received by determining that a predetermined time period has lapsed after the transmitting and that there has been no reply from the ledger server.

In some embodiments, the determining module determines that no index information for the second transaction request has been received by determining that a reply from the ledger server indicates that the ledger server fails to store at least one of storage information of the second transaction request or authentication information in the second transaction request.

In some embodiments, the second storage request includes a public key calculated by the ledger proxy based on authentication information in the second transaction request, and the determining module determines that no index information for the second transaction request has been received by determining a reply from the ledger server indicating that the public key is not authorized to access a second index stream and a second storage stream that correspond to the second transaction request.

In some embodiments, the apparatus 830 further includes a marking module that marks the second transaction request as trash in the second request stream by the ledger proxy.

In some embodiments, the first transmitting module 836 concurrently transmits storage requests for a third plurality of transaction requests stored in the plurality of request streams to one or more ledger servers.

In some embodiments, the apparatus 830 further includes a selecting module that selects the ledger server from a plurality of ledger servers based on information of the transaction request.

In some embodiments, the storage information of the transaction request includes: an identifier of the request stream among the plurality of request streams and a location of the transaction request in the request stream.

In some embodiment, the index information includes: an identifier of the index stream among a plurality of index streams and an identifier of the index in the index stream.

Figure 8C:
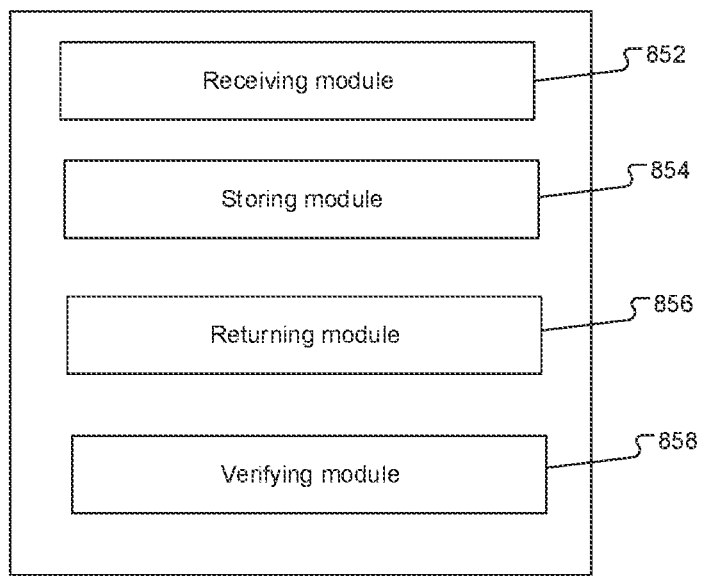
FIG. 8C depicts examples of modules of another apparatus in accordance with embodiments of this specification.

FIG. 8C depicts examples of modules of another apparatus 850 in accordance with embodiments of this specification. The apparatus 850 can be an example of an embodiment of a ledger server in a ledger system configured to store transaction requests in the ledger system. The apparatus 850 can correspond to the embodiments described above, and the apparatus 830 includes the following: a receiving module 852 that receives a storage request for a transaction request stored in a request stream by the ledger server, the storage request including storage information of the transaction request in the request stream and authentication information of a transaction corresponding to the transaction request; a storing module 854 that stores the storage information of the transaction request in an index of an index stream by the ledger server, and stores the authentication information of the transaction request in a storage element of a storage stream by the ledger server, the storage stream being associated with the index stream, the storage element corresponding to the index; and a returning module 856 that returns an index identifier of the index for the transaction request by the ledger server.

In some embodiments, the storage request includes a public key calculated based on the authentication information of the transaction.

In some embodiments, the apparatus 850 further includes a verifying module 858 that verifies whether the public key in the storage request is authorized to access the index stream and the storage stream by the ledger server.

In some embodiments, storing the storage information of the transaction request and the authentication information of the transaction is in response to verifying that the public key is authorized.

In some embodiments, the storing module 854 stores the public key, together with the authentication information of the transaction, in the storage element of the storage stream by the ledger server.

In some embodiments, the verifying module 858 verifies whether the public key in the storage request is authorized to access the index stream and the storage stream by verifying whether the public key in the storage request matches with an authenticated public key associated with the index stream and the storage stream.

In some embodiments, the verifying module 858 verifies whether a second public key in a second storage request corresponding to a second transaction request is authorized to access a second index stream and a second storage stream that correspond to the second transaction request by the ledger server. In response to verifying that the second public key is invalid, the returning module 856 returns an error message by the ledger server.

In some embodiments, the receiving module 852 receives a plurality of storage requests for a plurality of transaction requests stored in the request stream by the ledger server, each storage request including storage information of a respective transaction request in the request stream and authentication information of a transaction corresponding to the respective transaction request.

In some embodiments, the storing module 854 stores the storage information of the plurality of transaction requests in a plurality of indexes in the index stream and the authentication information of the transactions corresponding to the plurality of transaction requests in a plurality of storage elements in the storage stream by the ledger server, a storing order of the plurality of indexes in the index stream being same as a storing order of the plurality of storage elements in the storage stream.

In some embodiments, a storing order of the plurality of transaction requests in the request stream is different from the storing order of the plurality of storage elements in the storage stream.

In some embodiments, the storage element has a unique storage identifier among the storage stream, and the index has a unique index identifier among the index stream, the unique storage identifier being identical to the unique index identifier.

In some embodiments, storing the storage information of the transaction request in the index of the index stream is concurrent with storing the authentication information of the transaction in the storage element of the storage stream.

In some embodiments, the ledger server is associated with a plurality of ledgers, each ledger including a respective index stream and a respective storage stream associated with the respective index stream. The index identifier of the index includes: an identifier of the index stream among the respective index streams of the plurality of ledgers, and a unique identifier of the index stored in the index stream.

In some embodiments, the apparatus 850 further includes a selecting module that selects a ledger including the index stream and the storage stream from the plurality of ledgers based on the storage request by the ledger server.

In some embodiments, the apparatus 850 further includes a retrieving module that retrieves content information of the transaction from the request stream according to the index of the index stream by the ledger server, the transaction request including the content information of the transaction and the authentication information of the transaction that are stored in the request stream.

In some embodiments, the storage information of the transaction request includes: an identifier of the request stream among the plurality of request streams and a location of the transaction request in the request stream.

In some embodiments, the content information of the transaction includes: a header of the transaction that includes a local timestamp and a hash of the transaction, and a body of the transaction that includes payload information of the transaction including at least one of transfer participants, a transfer amount, transfer time, or transfer place, and the authentication information of the transaction includes the hash of the transaction and a client signature of the transaction (e.g., a client signature of the hash of the transaction). The content information can also include meta information.

The system, apparatus, module, or unit illustrated in the previous embodiments can be implemented by using a computer chip or an entity, or can be implemented by using a product having a certain function. A typical embodiment device is a computer (and the computer can be a personal computer), a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

Referring again to FIG. 8A, 8B, or 8C, it can be interpreted as illustrating internal functional modules and a structure of a ledger implementation apparatus. The ledger implementation apparatus can be an example of a ledger system configured to store transaction requests in the ledger system, a ledger proxy in the ledger system, or a ledger server in the ledger system. An execution body in essence can be an electronic device, and the electronic device includes the following: one or more processors; and one or more computer-readable memories configured to store an executable instruction of the one or more processors. In some embodiments, the one or more computer-readable memories are coupled to the one or more processors and have programming instructions stored thereon that are executable by the one or more processors to perform algorithms, methods, functions, processes, flows, and procedures, as described in this specification. This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on its software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiment can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method managing transaction requests in a ledger system, the method comprising:
   receiving a plurality of transaction requests by a ledger proxy, each of the plurality of transaction requests comprising content information of a corresponding transaction and authentication information of the corresponding transaction;
   storing each of the plurality of transaction requests in a respective request stream of a plurality of request streams by the ledger proxy;
   transmitting a storage request for a transaction request stored in a request stream of the plurality of request streams to a ledger server by the ledger proxy, the storage request comprising:

storage information of the transaction request in the request stream, the storage information comprising a location of the transaction request in the request stream; and authentication storage information of a transaction corresponding to the transaction request that comprises authentication information of the transaction included in the transaction request;

receiving index information corresponding to the storage request for the transaction request from the ledger server by the ledger proxy, the index information indicating a location of the storage information stored in an index stream by the ledger server, the authentication storage information being stored by the ledger server in a storage stream that is associated with but different from the index stream; and transmitting a response for the transaction request to a client device by the ledger proxy, the response comprising the index information corresponding to the transaction request.

2. The computer-implemented method of claim 1, wherein the index information comprises an index identifier of an index in the index stream, the index comprising the storage information of the transaction request.

3. The computer-implemented method of claim 2, wherein a location of the authentication storage information stored in the storage stream is associated with the location of the storage information stored in the index stream, and wherein the index corresponds to a storage element in the storage stream associated with the index stream, the storage element storing the authentication storage information of the transaction.

4. The computer-implemented method of claim 1, further comprising:

determining whether authentication information of a corresponding transaction of a received transaction request is valid; and performing at least one of:

in response to determining that authentication information corresponding to a first transaction request is valid, storing the first transaction request in a respective request stream of the plurality of request streams, or in response to determining that authentication information corresponding to a second transaction request is invalid, determining not to store the second transaction request and returning an error message to a second client device providing the second transaction request.

5. The computer-implemented method of claim 4, wherein the authentication information of the corresponding transaction comprises a hash of the corresponding transaction and a signature of the hash of the corresponding transaction encrypted by a private key, and wherein determining whether the authentication information of the corresponding transaction is valid comprises calculating a public key corresponding to the private key based on the authentication information of the corresponding transaction.

6. The computer-implemented method of claim 5, wherein the storage request for the transaction request comprises a public key calculated by the ledger proxy based on the authentication information of the transaction.

7. The computer-implemented method of claim 1, wherein the authentication information of the transaction comprises a hash of the transaction, the method further comprising:

after receiving the index information from the ledger server, generating a server signature of the hash of the transaction, and transmitting the response including the server signature and the index information to the client device.

8. The computer-implemented method of claim 1, further comprising:

transmitting a second storage request for a second transaction request stored in a second request stream of the plurality of request streams to the ledger server by the ledger proxy;

determining that no index information for the second transaction request has been received from the ledger server by the ledger proxy; and transmitting an error message to a second client device providing the second transaction request by the ledger proxy.

9. The computer-implemented method of claim 8, wherein determining that no index information for the second transaction request has been received comprises:

determining that a predetermined time period has lapsed after the transmitting and that there has been no reply from the ledger server.

10. The computer-implemented method of claim 8, wherein determining that no index information for the second transaction request has been received comprises:

determining that a reply from the ledger server indicates that the ledger server fails to store at least one of storage information of the second transaction request or authentication information in the second transaction request.

11. The computer-implemented method of claim 8, wherein the second storage request comprises a public key calculated by the ledger proxy based on authentication information in the second transaction request, and wherein determining that no index information for the second transaction request has been received comprises:

determining a reply from the ledger server indicating that the public key is not authorized to access a second index stream and a second storage stream that correspond to the second transaction request.

12. The computer-implemented method of claim 9, further comprising:

marking the second transaction request as a trash in the second request stream by the ledger proxy.

13. The computer-implemented method of claim 1, further comprising:

concurrently transmitting storage requests for a third plurality of transaction requests stored in the plurality of request streams to one or more ledger servers.

14. A computer-implemented system for managing transaction requests in a ledger system, comprising:

one or more processors; and one or more computer-readable memories coupled to the one or more processors and having instructions stored thereon that are executable by the one or more processors to perform one or more operations comprising:

receiving a plurality of transaction requests by a ledger proxy, each of the plurality of transaction requests comprising content information of a corresponding transaction and authentication information of the corresponding transaction;

storing each of the plurality of transaction requests in a respective request stream of a plurality of request streams by the ledger proxy;

transmitting a storage request for a transaction request stored in a request stream of the plurality of request streams to a ledger server by the ledger proxy, the storage request comprising:

storage information of the transaction request in the request stream, the storage information comprising a location of the transaction request in the request stream; and authentication storage information of a transaction corresponding to the transaction request that comprises authentication information of the transaction included in the transaction request;

receiving index information corresponding to the storage request for the transaction request from the ledger server by the ledger proxy, the index information indicating a location of the storage information stored in an index stream by the ledger server, the authentication storage information being stored by the ledger server in a storage stream that is associated with but different from the index stream; and transmitting a response for the transaction request to a client device by the ledger proxy, the response comprising the index information corresponding to the transaction request.

15. The computer-implemented system of claim 14, wherein the index information comprises an index identifier of an index in the index stream, the index comprising the storage information of the transaction request.

16. The computer-implemented system of claim 14, wherein the authentication information of the transaction comprises a hash of the transaction, the one or more operations further comprising:

after receiving the index information from the ledger server, generating a server signature of the hash of the transaction, and transmitting the response including the server signature and the index information to the client device.

17. The computer-implemented system of claim 14, the one or more operations further comprising:

transmitting a second storage request for a second transaction request stored in a second request stream of the plurality of request streams to the ledger server by the ledger proxy;

determining that no index information for the second transaction request has been received from the ledger server by the ledger proxy; and transmitting an error message to a second client device providing the second transaction request by the ledger proxy.

18. A non-transitory, computer-readable storage medium for managing transaction requests in a ledger system, the non-transitory, computer- readable storage medium storing one or more instructions executable by a computer system to perform operations comprising:

receiving a plurality of transaction requests by a ledger proxy, each of the plurality of transaction requests comprising content information of a corresponding transaction and authentication information of the corresponding transaction;

storing each of the plurality of transaction requests in a respective request stream of a plurality of request streams by the ledger proxy;

transmitting a storage request for a transaction request stored in a request stream of the plurality of request streams to a ledger server by the ledger proxy, the storage request comprising:

storage information of the transaction request in the request stream, the storage information comprising a location of the transaction request in the request stream; and authentication storage information of a transaction corresponding to the transaction request that comprises authentication information of the transaction included in the transaction request;

receiving index information corresponding to the storage request for the transaction request from the ledger server by the ledger proxy, the index information indicating a location of the storage information stored in an index stream by the ledger server, the authentication storage information being stored by the ledger server in a storage stream that is associated with but different from the index stream; and transmitting a response for the transaction request to a client device by the ledger proxy, the response comprising the index information corresponding to the transaction request.

19. The non-transitory, computer-readable storage medium of claim 18, wherein the index information comprises an index identifier of an index in the index stream, the index comprising the storage information of the transaction request.

20. The non-transitory, computer-readable storage medium of claim 18, the operations further comprising:

transmitting a second storage request for a second transaction request stored in a second request stream of the plurality of request streams to the ledger server by the ledger proxy;

determining that no index information for the second transaction request has been received from the ledger server by the ledger proxy; and transmitting an error message to a second client device providing the second transaction request by the ledger proxy.

* * * * *